United States Patent [19]

Merkl

[11] 4,029,747
[45] June 14, 1977

[54] METHOD OF PREPARING INORGANIC MONOMERIC AND POLYMERIC COMPLEXES AND PRODUCTS SO PRODUCED

[75] Inventor: George G. Merkl, Haworth, N.J.

[73] Assignee: Molecular Energy Research Co., Inc., Houston, Tex.

[22] Filed: Nov. 17, 1975

[21] Appl. No.: 631,949

Related U.S. Application Data

[63] Continuation-in-part of Ser. No. 527,355, Nov. 26, 1974.

[52] U.S. Cl. .................................. 423/413; 423/351
[51] Int. Cl.$^2$ .......................................... C01B 21/00
[58] Field of Search .......... 423/351, 413, 371, 409; 44/64, 67; 149/36

[56] References Cited

UNITED STATES PATENTS

| 2,163,100 | 6/1939 | Miller et al. ........................ 423/413 |
| 2,202,994 | 6/1940 | Nieuwland .......................... 423/413 |
| 2,971,988 | 2/1961 | Hill et al. ............................ 423/413 |
| 3,350,172 | 10/1967 | Grakauskas ........................ 423/351 |
| 3,523,047 | 8/1970 | Bridgeforth et al. ................ 149/36 |
| 3,797,238 | 3/1974 | Iwanciow et al. ................... 149/36 |

FOREIGN PATENTS OR APPLICATIONS

| 586,843 | 11/1959 | Canada ............................... 423/413 |
| 510,631 | 1/1915 | France ................................ 423/413 |
| 76,038 | 3/1915 | Switzerland ........................ 423/413 |
| 25,891 | 11/1912 | United Kingdom ................ 423/413 |

OTHER PUBLICATIONS

Angw. Chemie. (Int. Edit.) vol. 3, No. 7—1964—Amides of the Alkali & Alkaline Earth Metals, pp. 471 to 481.
Jour. of the Chemical Soc., vol. XCII, Pt. II—1907—p. 9356.
Chemical Reviews (JACS), vol. 54, Feb. to June 1954, pp. 449–466.
Chemical Review (JACS), vol. 8, Feb. to June 1954, pp. 265–272.
Developments in Inorganic Nitrogen Chemistry—Colburn—1966—pp. 249–252.

*Primary Examiner*—O. R. Vertiz
*Assistant Examiner*—Eugene T. Wheelock
*Attorney, Agent, or Firm*—Arnold, White & Durkee

[57] ABSTRACT

Novel water soluble, inorganic complexes are obtained by reacting, in the presence of aqueous ammonia, at least one non-alkaline metal selected from Groups I-VIII of the Periodic Table with an alkali metal hydroxide. An excess of the non-alkaline metal or metals is introduced into a reaction vessel, preferably already containing the aqueous ammonia, and the alkali metal hydroxide is thereafter incrementally added in such manner as to create localized areas of high concentration and pH approaching a value of 14. The hydrooxide in these areas of high concentration, in combination with reactive $NH_2$ groups provided by the aqueous ammonia, causes erosion of the non-alkaline metal, the formation of non-alkaline metal ions and the production of a monomeric, metal amide complex. The reaction parameters are maintained such that the rate of addition of alkali metal hydroxide is sufficient to suppress the expulsion from the system of ammonia gas while at the same time producing an overall endothermic reaction in which the ions of the alkali metal, the non-alkaline metal and the $NH_2$ groups react to produce an inorganic complex. If the endothermic reaction is maintained and sufficient excess non-alkaline metal is present in the aqueous medium, after a period of time the reaction will enter an exothermic phase, producing an inorganic polymeric complex which remains soluble in water throughout a substantial molecular weight range.

27 Claims, 27 Drawing Figures

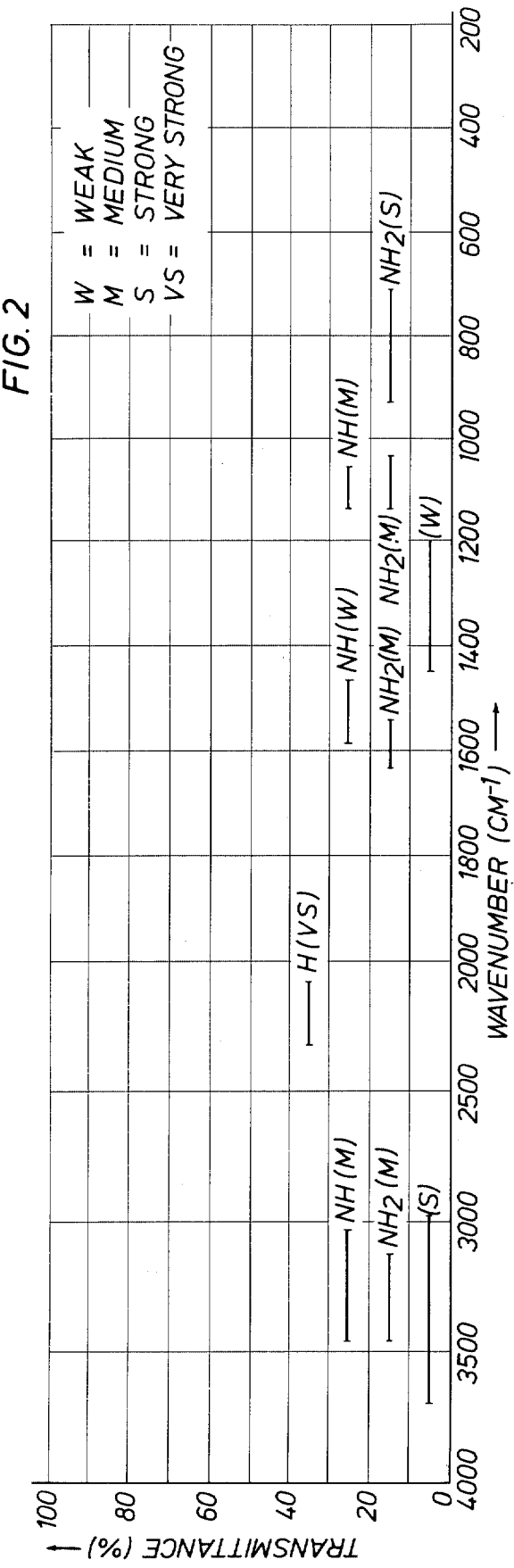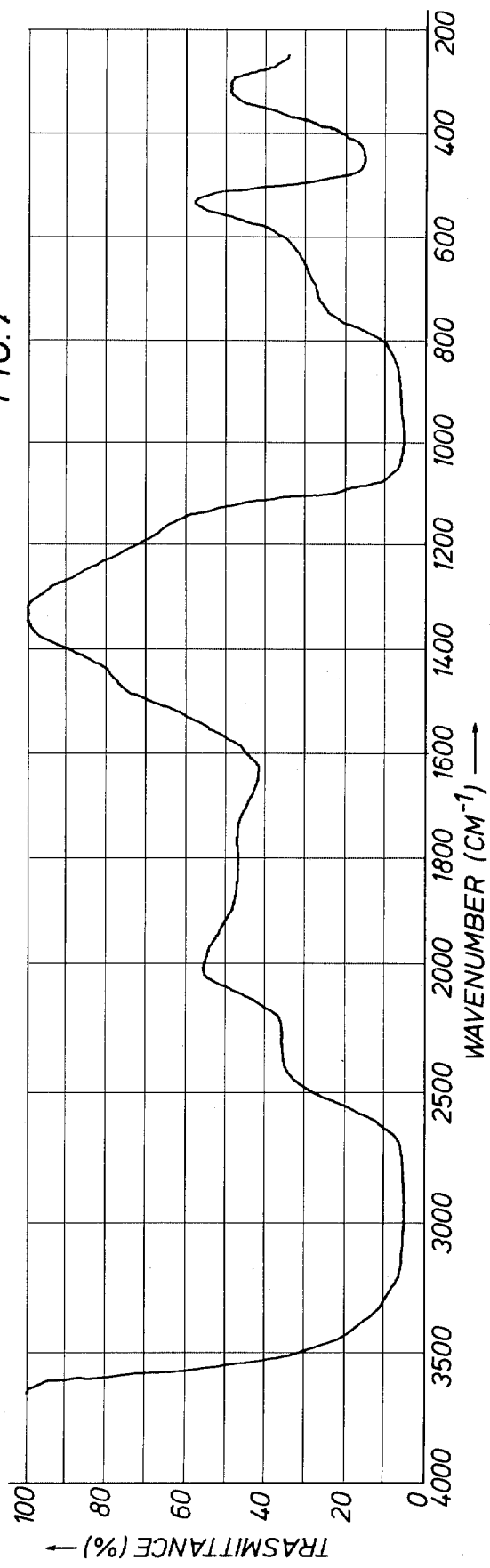
FIG.2
FIG.7

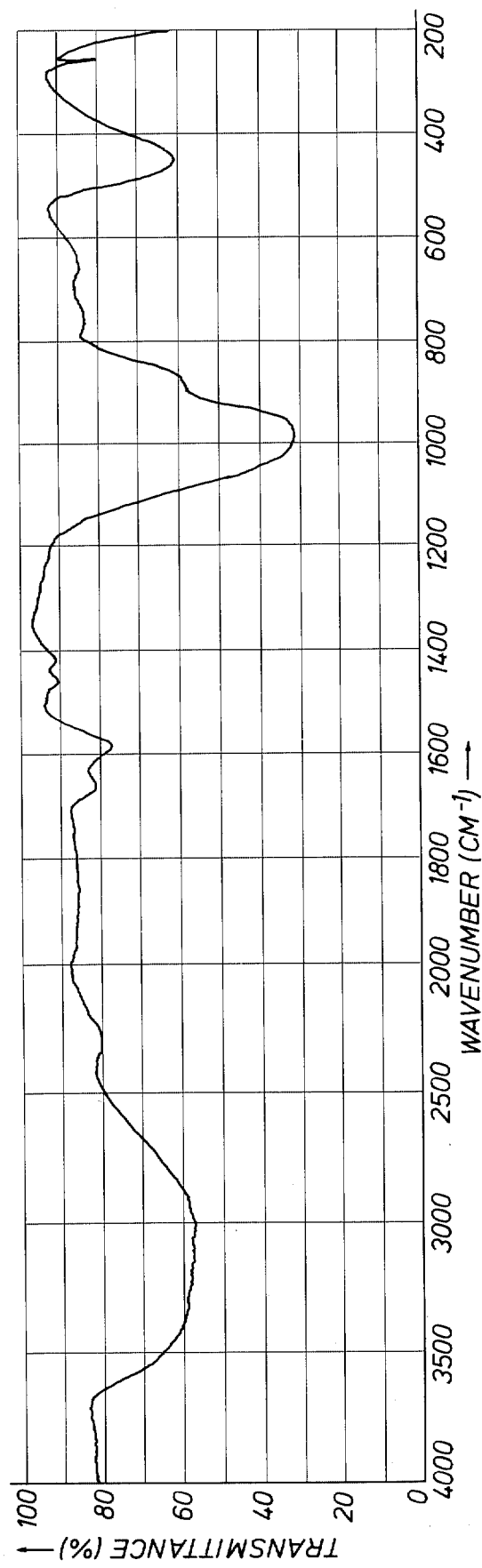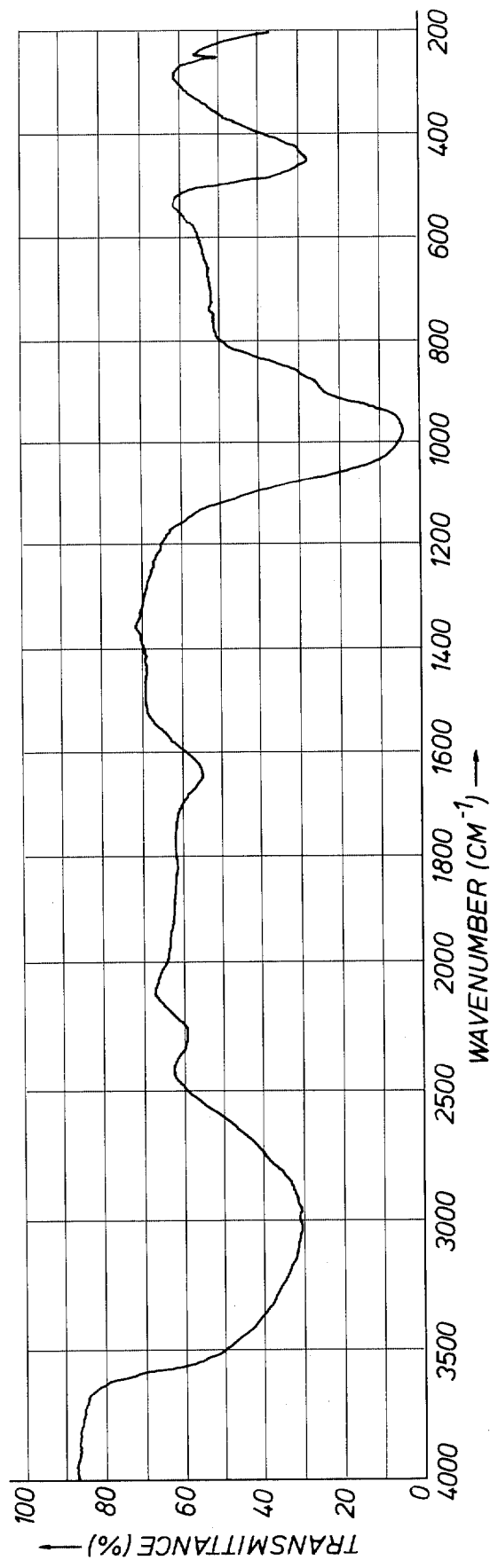

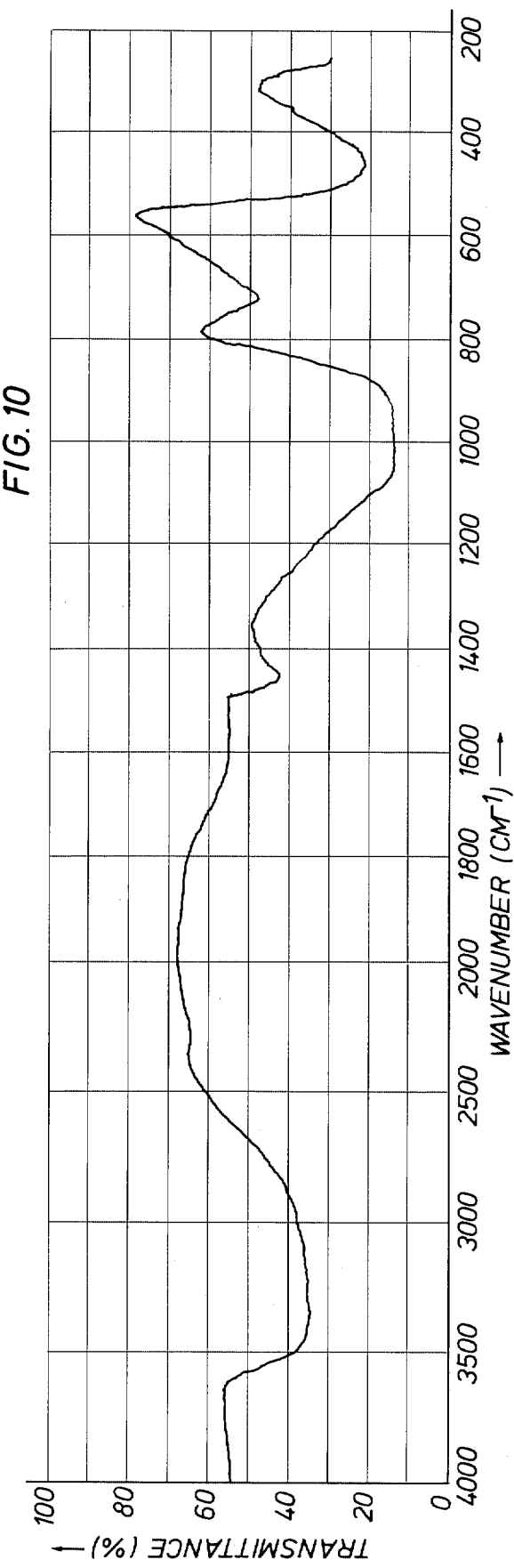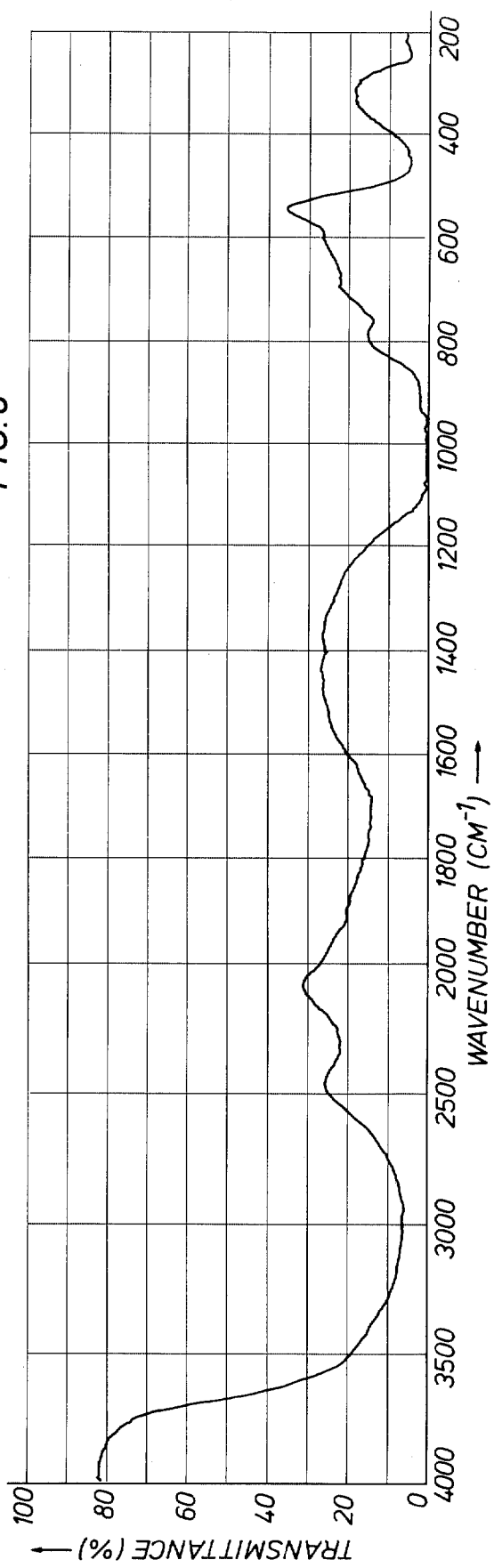

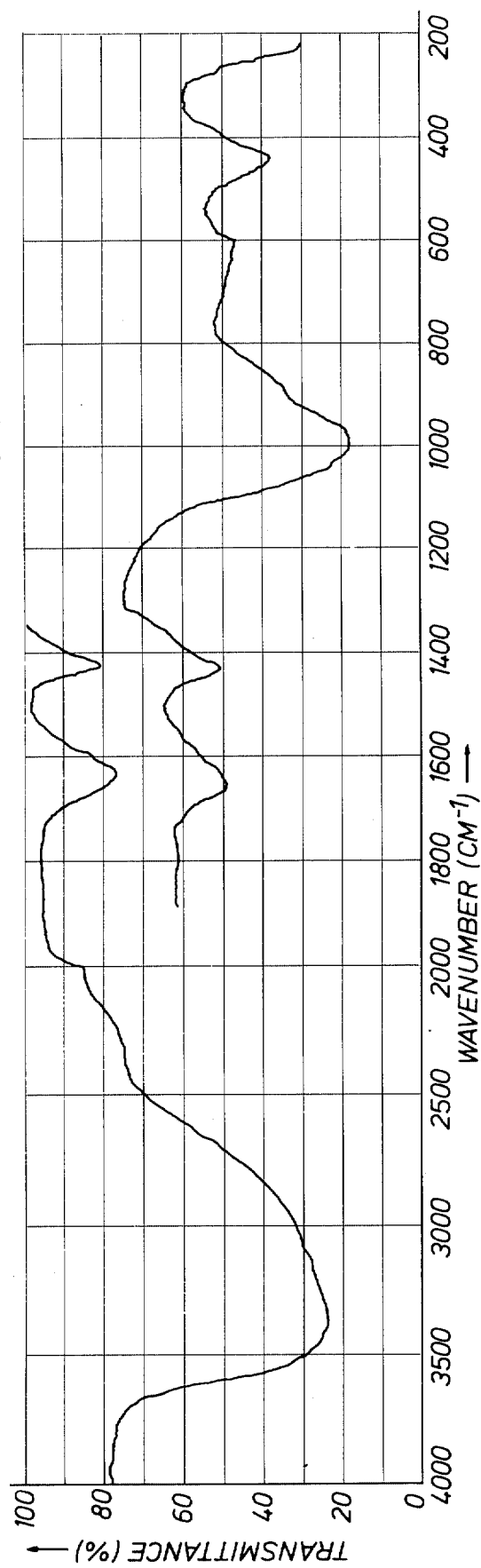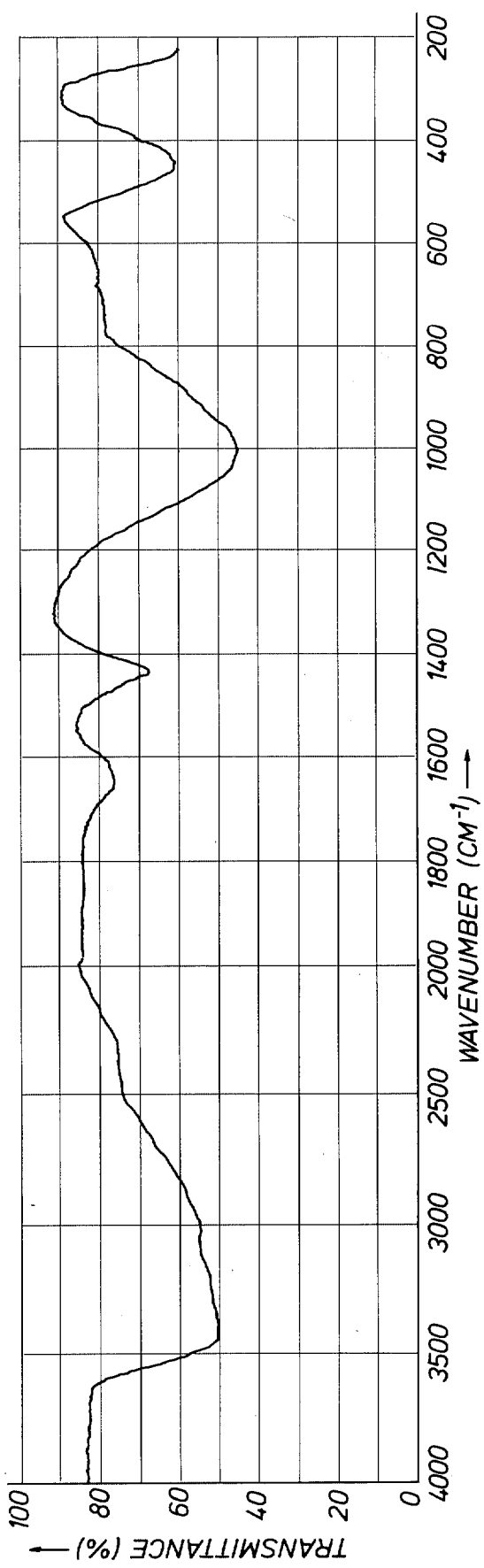

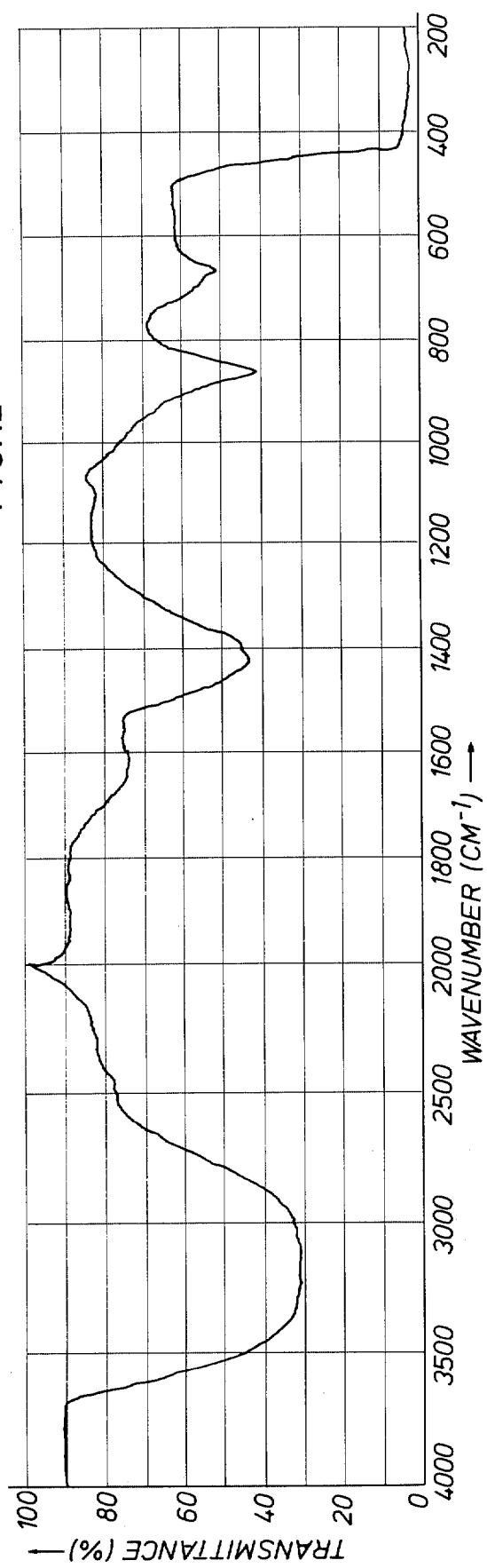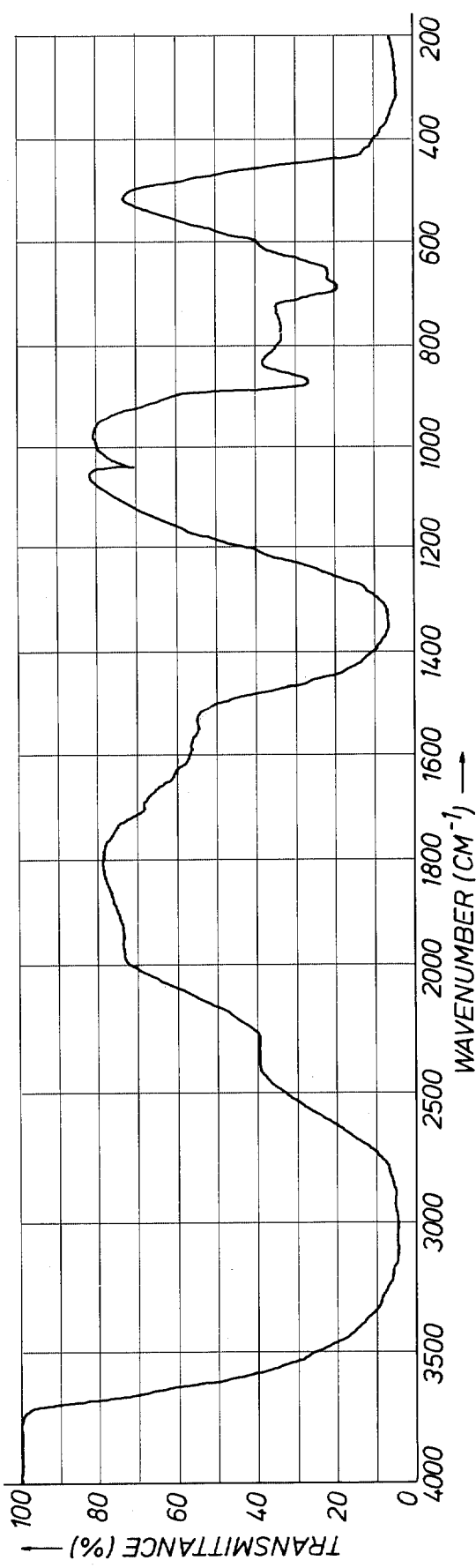

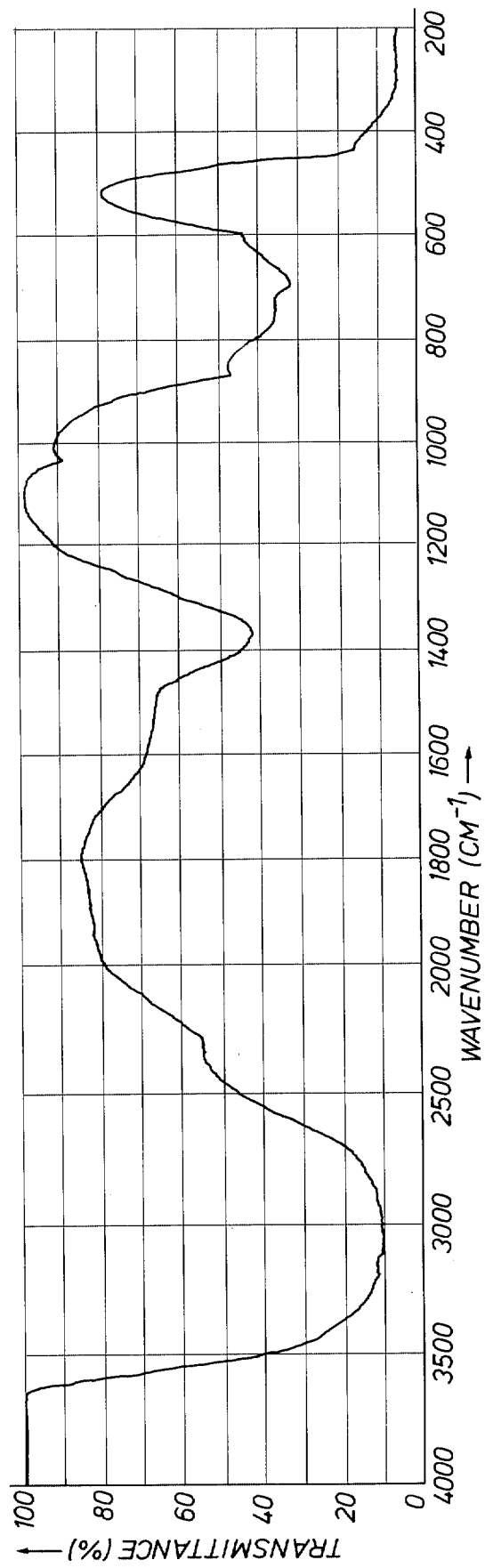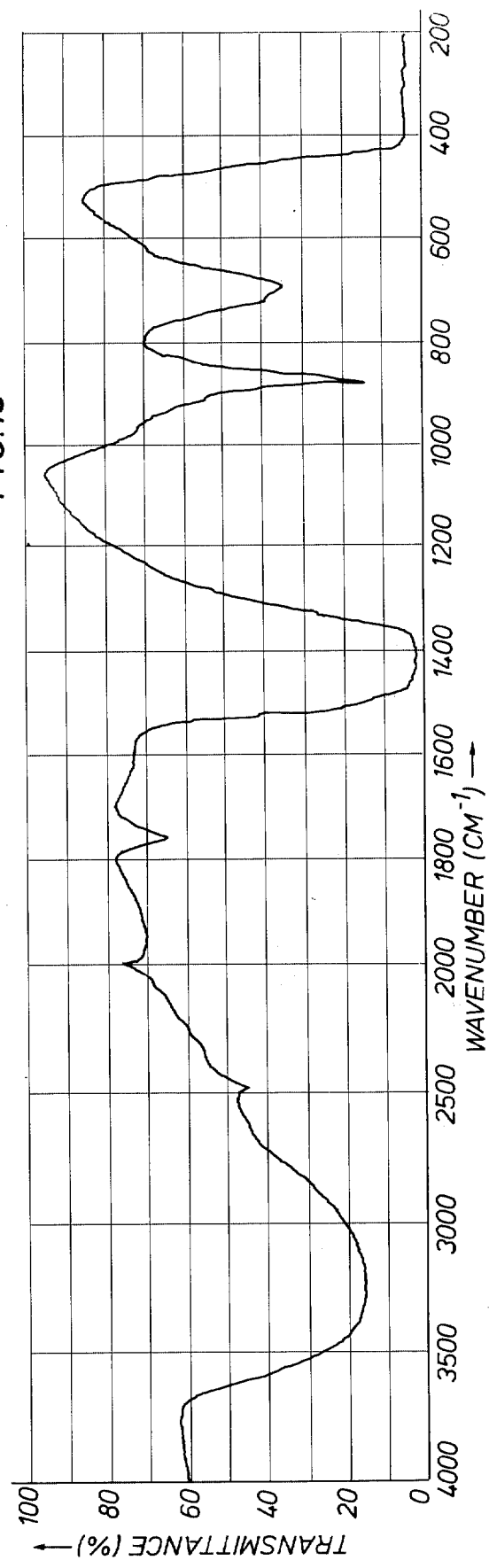

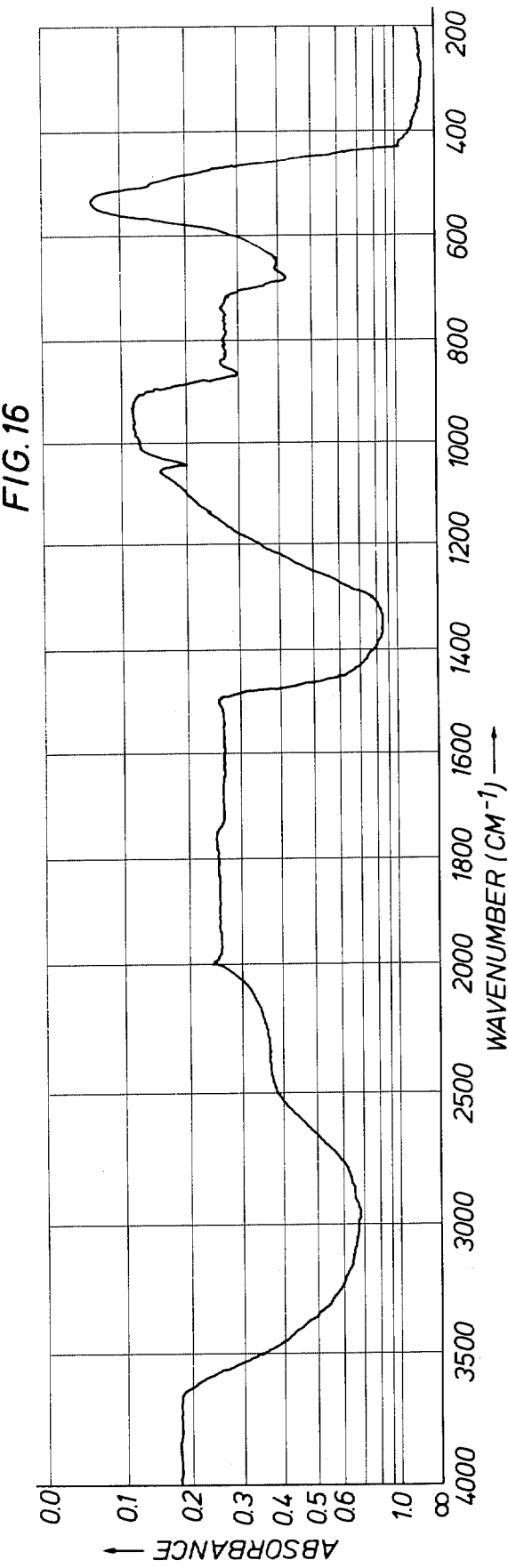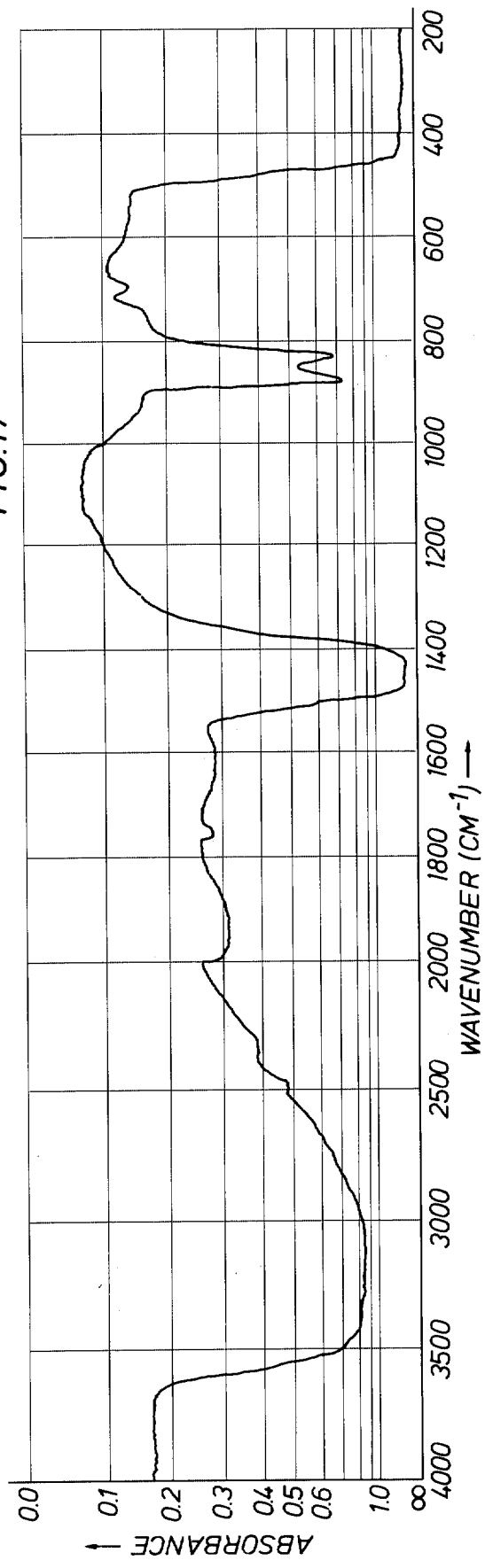

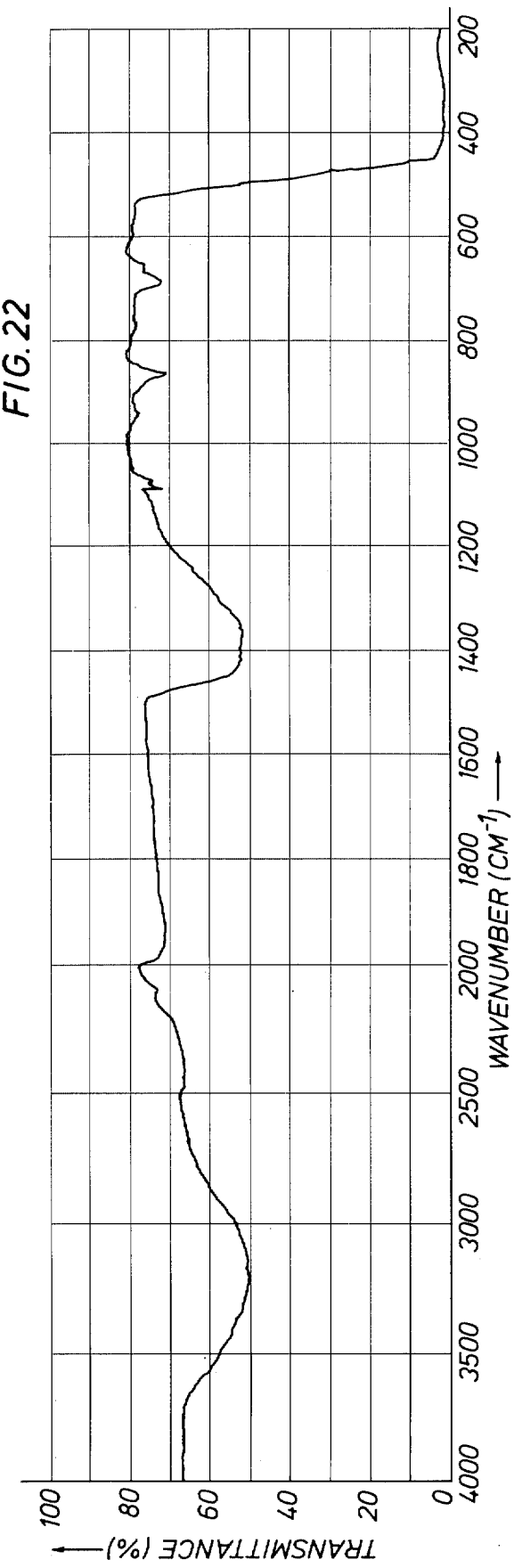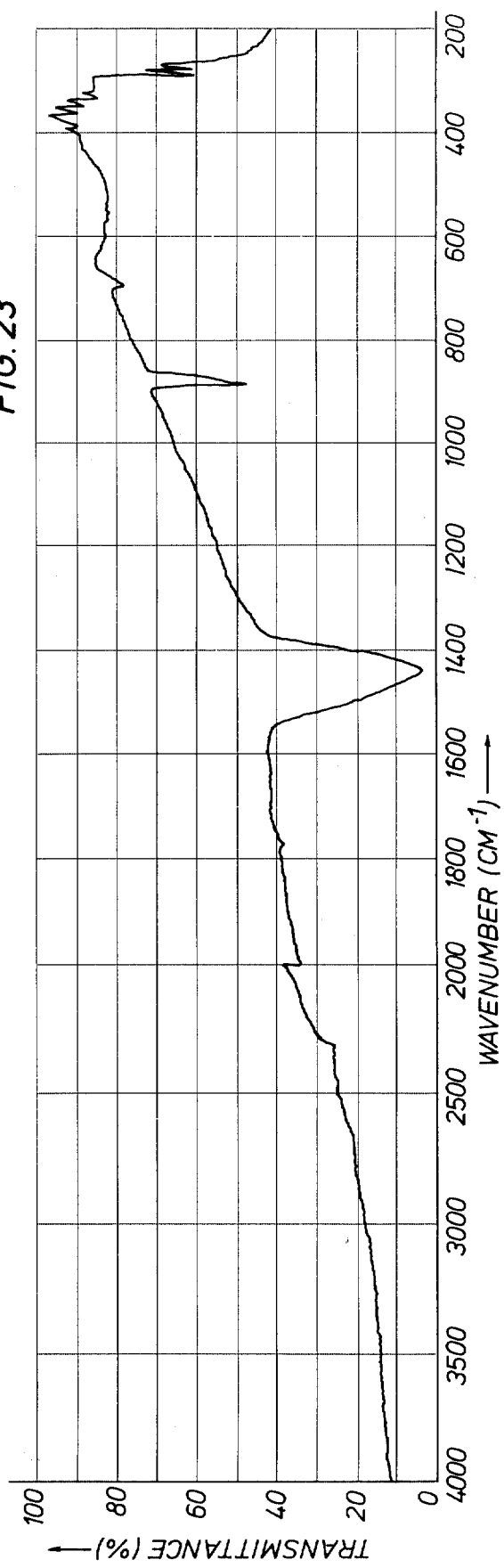

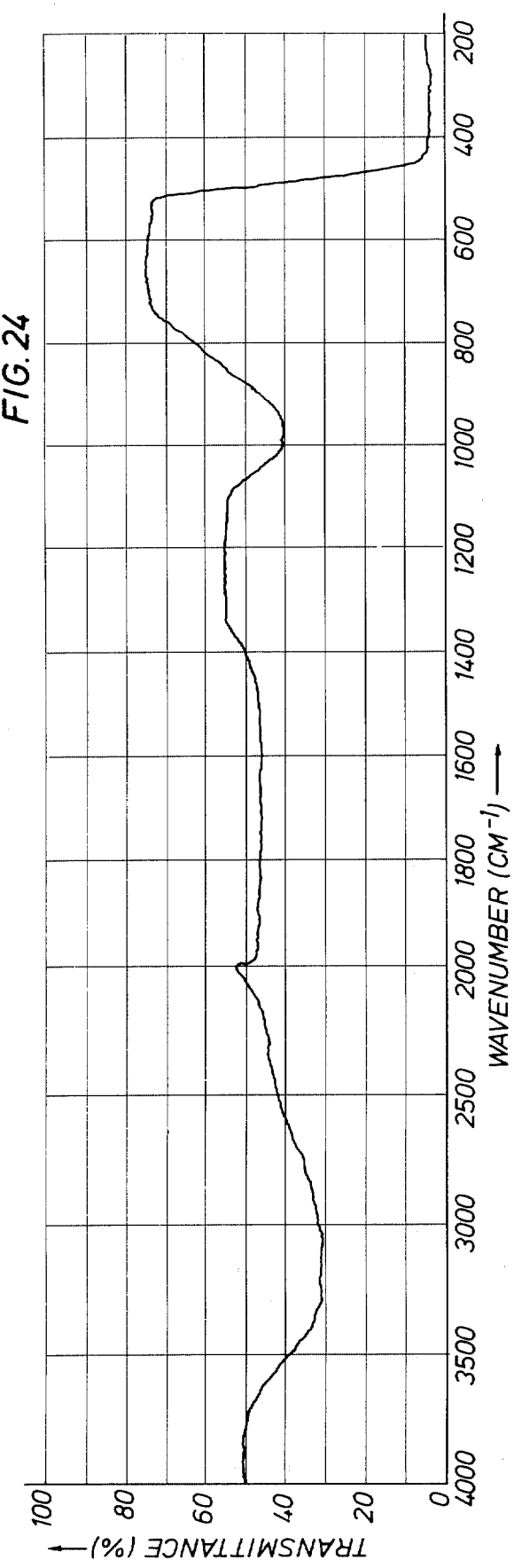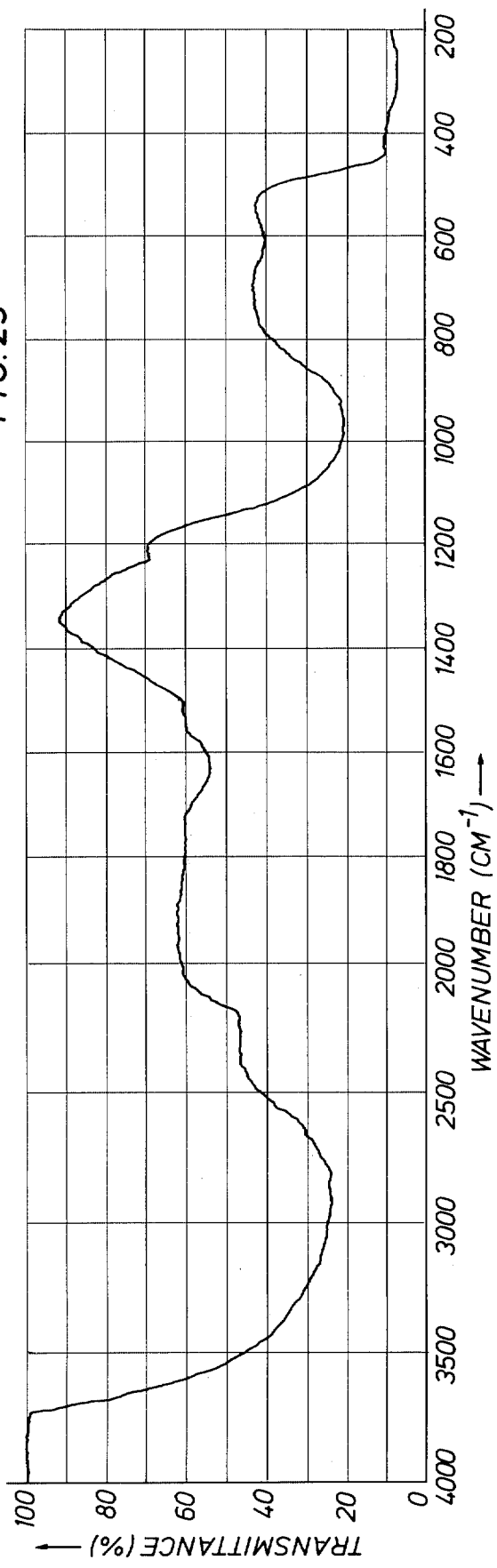

METHOD OF PREPARING INORGANIC MONOMERIC AND POLYMERIC COMPLEXES AND PRODUCTS SO PRODUCED

RELATED APPLICATION

This application is a continuation-in-part of applicant's co-pending application Ser. No. 527,355, filed Nov. 26, 1974, and entitled "Multi Metal Aminates."

SUMMARY OF THE INVENTION

The present invention is directed to the production of heretofore unknown multi-metal inorganic monomeric complexes and the inorganic polymeric complexes, generated therefrom, and the aqueous solutions containing same.

Classical chemical theory would suggest that, where a metal is dissolved by, or eroded in the presence of, an alkali and an $NH_2$ source such as ammonia, salt formation will result. For example, using aluminum as a typical metal, one might expect that in alkali medium containing aqueous ammonia and sodium hydroxide, an aluminum salt, sodium aluminate, will form. Furthermore, classical chemical theory would also predict that the addition of an alkali metal hydroxide, such as sodium hydroxide, to an aqueous ammonia medium would result in an immediate liberation of ammonia. These typical, reactive consequences of the interactions mentioned are unexpectedly avoided by the methods of the present invention.

According to the present invention, a quantity of non-alkaline metal, which may be one or more metals selected from the non-alkaline metals of groups I–VIII of the periodic table, is first introduced into a reaction vessel containing an aqueous medium. A supply of a source of reactive $NH_2$ groups, preferably aqueous ammonia, is provided to the reaction vessel. This is preferably accomplished by first saturating the aqueous ammonia and thereafter, bubbling additional ammonia gas, with or without reflux, into the system as needed. In the presence of the source of reactive $NH_2$ groups, an alkali metal hydroxide is added to the reaction medium.

The alkali metal hydroxide is added in such manner as to provide and assure intimate contact between the alkali metal ions formed and the non-alkaline metal within a localized area in the immediate vicinity of the non-alkaline metal, and to produce a very high pH in this localized area, approaching a value of 14.

The rate of addition of the alkali metal hydroxide as well as its physical form (preferably, as solid pellets) will have an understandable effect on the maintenance of high concentration and high pH at the localized areas of intimate contact. Further, the rate of alkali metal hydroxide should be such as to bind substantial quantities of $NH_2$ groups in a reaction with the alkali metal hydroxide and the non-alkaline metal, which is endothermic in nature.

In the presence of the source of $NH_2$ groups, the addition of the alkali metal hydroxide in the manner set forth above results in an erosion of the non-alkaline metal, whereby metal ions are produced in the reaction medium entering into reaction with the $NH_2$ groups and the alkali metal ions to form an inorganic, bi metal amide complex which, as explained hereinafter, will be referred to as an inorganic monomeric complex.

At a subsequent point in the reaction, primarily dictated by the relative proportions of the reactants, the reaction spontaneously develops an exothermic phase, which is characterized by increased dissolution or erosion of the metal or metals present. This signals the end of production of the inorganic monomeric complex and the beginning of a polymerization reaction which results in the formation of an inorganic polymeric complex.

The reaction can be terminated at any time during either the endothermic phase or the exothermic phase by withdrawing any unreacted metal from the reaction medium. The product of the endothermic phase of the reaction appears to be an inorganic complex which includes the alkali metal, the one or more non-alkaline metals reacted therewith and a number of $NH_2$ groups. This inorganic complex also appears to be at least the precursor of the basic repeating unit of the inorganic polymeric complex produced during the exothermic phase of the reaction. However, due probably to the taking up of evolved hydrogen and an apparent breakdown of at least some $NH_2$ during the exothermic phase reaction, the inorganic polymeric complex appears to contain hydride (H) groups in addition to the alkali metal, non-alkaline metal or metals and NH and $NH_2$ groups. In any event, as referred to herein, the term "inorganic monomeric complex" will be used to refer to the product obtained during the endothermic phase reaction, while the term "inorganic polymeric complex" will be used to refer to the product formed during the exothermic phase reaction. As explained in more detail hereinafter, the presence of each of the groups within the monomeric and polymeric complexes has been established through analytical techniques.

Those of ordinary skill in the art will recognize that, in order to avoid the formation of salts and/or the release of large quantities of ammonia, the addition of the alkali metal hydroxide must be at a rate such that substantial quantities of $NH_2$ groups, as they are provided to the system, are taken up and bound into the complex. This will be governed to some extent by the rate at which the non-alkaline metal erodes, providing ions for reaction. While some ammonia will necessarily be released from the reaction as the alkali metal hydroxide goes into solution, this effect may be minimized by refluxing and/or the bubbling or additional ammonia gas into the reaction medium.

It is preferred to add the alkali metal hydroxide to an aqueous medium which has already been saturated with the source of $NH_2$ groups. It is, however, likewise acceptable, in the practice of the present invention, to add the source of $NH_2$ groups (for example, aqueous ammonia, ammonia gas or an $NO_x$ source) to an aqueous medium already containing some dissolved alkali metal hydroxide, it again being understood that such addition should be at a rate as to release and substantially tie up $NH_2$ groups from the source thereof, while developing the required endothermic phase and that localized areas of pH approaching 14 exist. In similar manner, it is within the scope of the present invention to simultaneously feed both the alkali metal hydroxide and the source of $NH_2$ groups to the reaction medium at such rates as to effect this same result.

Those skilled in the art will appreciate that some non-alkaline metals of groups I–VIII of the periodic table will naturally dissolve or erode in the aqueous alkaline medium, sometimes even without the assistance of a preliminary reaction between the alkali metal and the NH₂ groups. As to these metals, the above method proceeds easily without the application of external sources for developing the endothermic phase and/or exothermic phase of the reaction. That is to say, the introduction of the reactants in accordance with the above sequence develops a natural endotherm which leads to a natural exothermic phase. However, where the particular metal utilized does not dissolve or erode easily in the reaction medium, it may be advantageous under certain circumstances to promote the reaction in one or more ways.

For example, an increase in the reaction rate can be achieved through one or more of the following:

an increase in the effective surface area of the metal or metals to react with the alkali metal hydroxide and source of NH₂ groups;

depolarization of the surface area of the metal or metals to increase hydrogen attack and erosion of these metal or metals, such as for example, by the addition of one or more metals which are easily eroded in contact with the hard to erode metals and/or application of the electric current;

external cooling of the reaction medium to force the reactants into the endothermic phase of the reaction with the concurrent tying up in the form of the inorganic monomeric complex of the alkali metal ions, amino groups and eroded metal or metals; and/or the application of external heat subsequent to the endothermic phase of the reaction in order to initiate the exothermic phase of the reaction wherein polarization of the inorganic monomeric complex occurs.

It is general practice in accordance with the method of the present invention to employ the non-alkaline metal or metals of groups I–VIII in the periodic table in amounts in excess of that which is expected to react with the source of NH₂ groups and the alkali metal hydroxide. Since the erosion of the non-alkaline metal or metals is essential for both inorganic monomeric complex production and inorganic polymeric complex production, termination of the reaction either in the exothermic phase or during or after the endothermic phase can be readily achieved by separating any unreacted non-alkaline metal or metals from the reaction medium.

Both the inorganic monomeric complex and the inorganic polymer complex produced through the method of the present invention have several established utilities. For example, the inorganic monomeric complex has been found particularly suitable for the production of soaps and bleach formulations in the manner described in co-pending application Ser. No. 534,084, filed Dec. 23, 1974, and entitled "Soaps and Detergents." Among the various uses thus far determined for the inorganic polymer complex, one of the more important is the use of the complex, in aqueous solution, for plating one or more of the various metals of groups I–VIII of the periodic table on various substrates.

DESCRIPTION OF THE DRAWINGS

In the drawings:

FIG. 2 is a chart of groups identifiable by infra-red analysis superposed on an infrared scan chart;

FIG. 3 is an infra-red scan of a Si-Na system after the endothermic phase of reaction;

FIG. 4 is an infra-red scan of a Si-Na system of a clear solution resulting from vacuum drying at 80° C. of the product after the exothermic phase of reaction;

FIG. 6 is an infra-red scan of a Si-K solid dehydrated system after the exothermic phase of reaction;

FIG. 7 is an infra-red scan of a Si-Na liquid system after the exothermic phase of reaction.

FIG. 8 is an infra-red scan of the Si-Na system of FIG. 7 after drying at 93° C.;

FIG. 9 is an infra-red scan of the Si-Na system of FIG. 7 after drying at 232° C.;

FIG. 10 is an infra-red scan of the Si-Na system of FIG. 7 after drying at 1093° C.;

FIG. 12 is an infra-red scan of a Ta-Na system;
FIG. 13 is an infra-red scan of a Sn-Na system;
FIG. 14 is an infra-red scan of a Be-K system;
FIG. 15 is an infra-red scan of a Zr-Na system;
FIG. 16 is an infra-red scan of a Nb-K system;
FIG. 17 is an infra-red scan of a Mo-Na system;
FIG. 22 is an infra-red scan of a Ti-Na system;
FIG. 23 is an infra-red scan of a Co-Na system;
FIG. 24 is an infra-red scan of a Si-Na system with 10% Na, effective for gem stone production;
FIG. 25 is an infra-red scan of a Si-Na system with 5% Na, effective for gem stone production.

DESCRIPTION OF PREFERRED EMBODIMENTS

Figure 1:
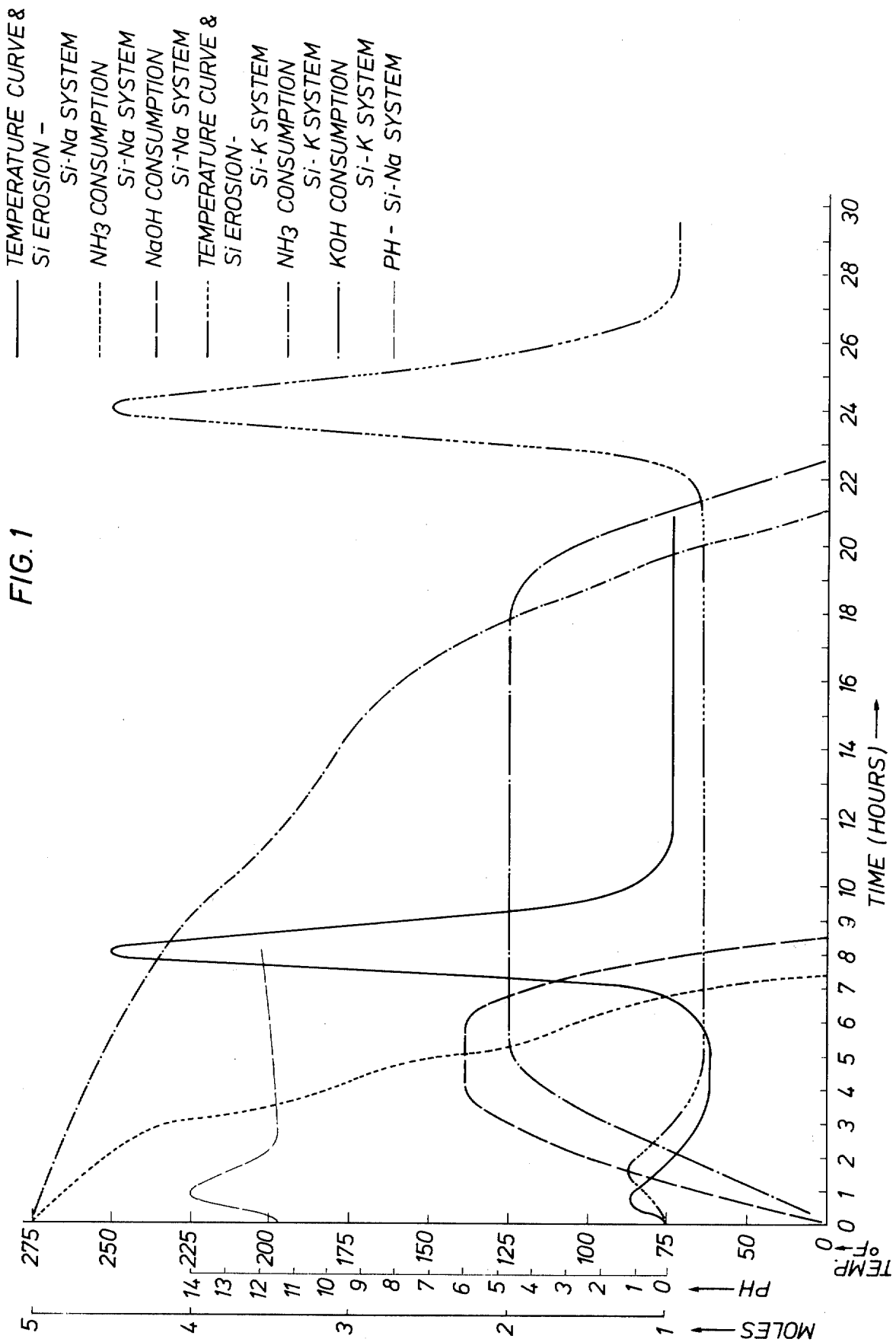
FIG. 1 is a diagramatic illustration of the reaction dynamics of the method of the present invention, plotting temperature and non-alkaline metal erosion, alkali metal consumption, ammonia consumption, and pH as a function of time for a Si-Na and Si-K model system.

The method of the present invention for the production of both the inorganic monomeric complex and the inorganic polymeric complex is carried out totally in an aqueous reaction medium. As a result, the inorganic monomeric complex and inorganic polymeric complex are produced as aqueous solutions of these products. For most applications, it will be unnecessary to separate the products from the aqueous solution. This is because the important utilities contemplated for the products of the present invention, for example, utilization of the monomeric complex in the production of soaps and bleach formulations, or of the polymeric complex in plating solutions are contemplated for use in aqueous solution form.

The following reactants are required:
a. at least one non-alkaline metal selected from groups I–VIII of the periodic table;
b. an alkali metal hydroxide; and
c. a source of reactive NH₂ groups. These reactants are individually discussed below.

The Non-Alkaline Metal

In the method of the present invention, the metal reactant may be any non-alkaline metal of groups I–VIII of the periodic table. Representative, non-limiting examples of applicable non-alkaline metals include:

Group I-B: copper, silver, gold
Group II-A: beryllium, magnesium
Group II-B: zinc, cadmium
Group III-A: aluminum, gallium, indium
Group IV-A: silicon, tin, lead
Group IV-B: titanium, zirconium, hafnium
Group V-A: antimony, bismuth
Group V-B: vanadium, niobium, tantalum
Group VI-A: selenium, tellurium
Group VI-B: chromium, molybdenum, tungsten
Group VII-B: manganese
Group VIII: iron, cobalt, nickel, palladium rhodium It should be recognized that while silicon, as a member of group IV-A, is not generally defined as a metallic element, silicon acts in the method of the present invention as a non-alkaline metal. Accordingly, the expression "non-alkaline metal of groups I–VIII of the periodic table" is meant to embrace any and all of the above and equivalent metals, including silicon. As will be further recognized, the term non-alkaline metal of groups I–VIII of the periodic table does not embrace the alkali metals of group I-A. The alkaline earth metals, calcium, strontium, and barium of group II-A, are similarly not within the scope of the term. On the other hand, beryllium and magnesium of group II-A can be applicably employed in the practice of this invention and these metals also fall within the scope of the expression non-alkaline metal of groups I–VIII of the periodic table as used throughout this specification.

In addition to a single non-alkaline metal, as defined above, the metal reactant of the present invention can advantageously comprise two or more such non-alkaline metals. As indicated previously, non-alkaline metals applicable include not only those metals of groups IV–III of the periodic table which are easily dissolved or eroded in an aqueous alkaline solution, but also those metals which do not readily dissolve. Apparently, the method of the present invention, possibly through the intermediate formation in site of alkali amides, provides for an environment effective to erode such metals, as will be explained in more detail subsequently, in order to increase the reactivity, i.e., the rate of erosion and entry into reaction of certain metals.

The non-alkaline metal is generally employed in a solid form, with the exception of gallium, for example, which is liquid at room temperature. In broad terms, it may be stated that reaction dynamics are related to the available surface area of the non-alkaline metal. Where the non-alkaline metal is in the form of extremely large chunks, there may be insufficient surface area per unit weight of non-alkaline metal for adequate erosion and reaction in accordance with the method of the present invention. Here, or where the metal erodes slowly and is difficult to react, it is often advisable to increase the reactivity of the metal by increasing the available surface area, such as by decreasing the particle size of the non-alkaline metal. Care must be taken, however, not to provide a particle size which is sufficiently reactive that erosion takes place too rapidly and an effective endothermic phase becomes difficult to achieve. On the other hand, with some metals, a decrease in the particle size of the non-alkaline metal can actually decrease the reaction dynamics. This latter effect appears to occur due to hydrogen polarization between the metal particles, not only at the surface of the powdered metal but also within the mass of metal particles. This has the effect of reducing the available hydrogen for metal erosion. Its reversal, or elimination, is explained hereinafter in the discussion dealing with reaction dynamics.

For any particular non-alkaline metal or combination of non-alkaline metals, the selection of size and/or shape of the metallic pieces can be easily determined by one skilled in the art, based upon an observation of reaction dynamics. In general, however, on a laboratory scale it has been found that a particle size of from about ½ inch to 1 inch in diameter for non-alkaline metal shot or sponge is particularly effective in achieving the advantageous results of the present invention. Of course, the method of the present invention can be carried out with equal efficiency using wires, foils or other convenient forms and shapes.

The Alkali Metal Hydroxide

The alkali metal hydroxide utilized as the second reactant in the methods of the present invention can comprise any hydroxide of a metal of group I-A of the periodic table, principally, sodium hydroxide, potassium hydroxide or lithium hydroxide. As will be explained in more detail hereinafter in connection with the discussion on reaction parameters, the alkali metal ions supplied to the reaction medium by the hydroxide enter into reaction and form a component of the inorganic complexes produced by the reaction. In addition, the alkali metal hydroxide appears responsible first for the release from the aqueous ammonia or ammonia gas or $NH_2$ groups and thereafter for binding up these groups and making them accessible to ions of the eroding non-alkaline metal in the formation of the products of the present invention.

As will be explained in more detail hereinafter, the particular alkali metal hydroxide employed does have some effect on the reaction dynamics. The preferred alkali metal hydroxide in accordance with the present invention is sodium hydroxide or potassium hydroxide.

While not favored in the practice of the method of the present invention, it should be recognized that under certain circumstances all or a portion of the alkali metal hydroxide may be replaced with one of the alkaline earth metal hydroxides.

The alkali metal hydroxide, specifically sodium hydroxide or potassium hydroxide, dissolves in the aqueous medium in the reaction of the present invention. The alkali metal hydroxide can be employed either in solid form or in the form of a prepared aqueous solution of the alkali metal hydroxide. In solid form, the alkali metal hydroxide can be in the form of pellets, powder or flakes. Alkali metal hydroxides such as sodium hydroxide and potassium hydroxide readily absorb carbon dioxide. It is preferred, in accordance with the present invention, to prevent as much of such carbon dioxide absorption as possible since the absorbed carbon dioxide does enter into the reaction to some extent and interferes with the production of the inorganic monomeric complex and inorganic polymeric complex. However, extreme precautions to prevent carbon dioxide absorption do not appear necessary.

As will be more fully explained hereinafter when discussing reaction parameter, the alkali metal hydroxide is generally metered slowly into the aqueous medium in such manner as to create localized areas in proximity to the non-alkaline parameters, metal which contain a high concentration of hydroxide ions at a pH approaching 14. The use of a solid form of the alkali metal hydroxide is quite advantageous in this respect, although it is also practicable to use an aqueous solution thereof for this metering or controlled addition.

The Source of $NH_2$ Groups

Analytical studies have shown that the inorganic monomeric complex produced in the method of the present invention contains $NH_2$ groups. Studies also indicate that the $NH_2$ are converted at least in part to hydride (H) and NH groups during polymerization to the inorganic polymeric complex. Accordingly, the third essential reactant in the method of the present invention comprises any substance which, under the conditions of the reaction, acts as a source of reactive $NH_2$ groups.

In the preferred reaction process, the source of $NH_2$ groups comprises aqueous ammonia. $NH_2$ groups are liberated when this aqueous ammonia is brought into reactive contact with the alkali metal hydroxide. As an alternative, ammonia gas may be used, introducing the gas into the reaction system of the present invention by any suitable conventional techniques, such as bubbling. The use of ammonia gas in this manner also permits a supplementing of the supply of the $NH_2$ source at any stage during the endothermic reaction phase. This permits better control in some circumstances and/or may be necessary to offset previous ammonia losses.

Another applicable alternative $NH_2$ source for use in the practice of the present invention may be formed directly in the reaction medium by utilizing as a reactant an $NO_x$ gas, i.e., NO and/or $NO_2$ or nitric acid. The use of $NO_x$ gas or nitric acid as a source of reactive $NH_2$ groups appears applicable due to the erosion of the non-alkaline metal and concurrent hydrogen ion production. These hydrogen ions react with the $NO_x$ groups in the reaction medium, creating in situ the reactive $NH_2$ groups. These reactive $NH_2$ groups are then available for metal amide formation and formation of the inorganic monomeric complex. When the non-alkaline metal is not easily eroded in the reaction medium upon alkali metal hydroxide addition, it may be necessary to assist the erosion so as to develop the hydrogen ions necessary for reactive $NH_2$ group production. This can be achieved, for example, by supplementing the $NO_x$ or nitric acid with ammonia gas at the onset of the reaction.

It is hypothesized that the reactant actually responsible (at least in part) for erosion of the non-alkaline metal and formation of both the inorganic monomeric complex and the inorganic polymeric complex is an alkali metal amide, formed in situ through the reaction of the alkali metal ions of the alkali metal hydroxide with the released $NH_2$ groups. A further alternative source of $NH_2$ groups, therefore, which is applicable in the method of the present invention, would be a preformed alkali metal amide, such as sodium amide. When using this alkali metal amide as the source of $NH_2$ groups, it may be possible to eliminate all or part of the alkali metal hydroxide.

REACTION PARAMETERS

Reactant Proportions

In the production of the inorganic polymeric complex of the present invention, the ratio of the alkali metal to the non-alkaline metal can be varied within wide limits. For example, such ratio may be varied from about 1:0.5 to 1:10 or more, this ratio being directly proportional to the effective surface area of the non-alkaline metal during the exothermic phase of the reaction. For example, where a great surface area exists and there is substantial erosion of the non-alkaline metal during the exothermic phase, there will be a greater ratio of non-alkaline metal to alkali metal in the inorganic polymeric complex. Likewise, the amount of alkali metal when compared with the non-alkaline metal will be greater where a small surface area of the non-alkaline metal exists during the exothermic phase of the reaction, and as a result, the erosion rate is less.

The molar ratio of alkali metal to non-alkaline metal in the inorganic monomeric complex prepared according to the preferred method of the present invention, will ideally be about 1:1, particularly with respect to metals which are easily eroded in the reaction of the present invention. The reason for this is that in accordance with the present invention, in the ideal reaction the alkali metal hydroxide is added to the reaction medium in an amount and at a rate proportional to the erosion of the non-alkaline metal. The rate of introduction of the alkali metal hydroxide can be easily determined by one of ordinary skill in the art by an examination and monitoring of the reaction dynamics, specifically the dissolution or erosion of the non-alkaline metal. Of course, where the non-alkaline metal erodes slowly or is otherwise difficult to react in accordance with the present invention, a substantially greater molar ratio of alkali metal than 1:1 may exist in the inorganic monomeric complex. A greater amount of non-alkaline metal compared to the alkali metal will, of course, be present in the inorganic polymeric complex due to greater erosion of the non-alkaline metal during the exothermic phase of the reaction. The addition of the alkali metal hydroxide to the reaction medium and the reaction dynamics based thereon will be more fully discussed in connection with the reaction dynamics of the method of the present invention.

Generally, in accordance with the present invention, the non-alkaline metal is employed in an amount in excess based on the desired molar ratio of alkali metal to nonalkaline metal in the inorganic polymeric complex. Since the formation of both the inorganic monomeric complex and the inorganic polymeric complex requires the presence of non-alkaline metal for reaction, the reaction of the present invention may be terminated conveniently at any stage, e.g., after the endothermic reaction or during or after the exothermic reaction, by simply removing the excess non-alkaline metal from the reaction medium.

As will be explained in greater detail hereinafter, the amount of the source of the $NH_2$ groups employed in the method of the present invention will generally be predetermined based upon the particular alkali and non-alkaline metals utilized. It has been determined that in the inorganic complexes formed in accordance with the present invention, the non-alkaline metal takes its lowest possible valence state (if in fact more than one valence state is possible). It is further believed that in the inorganic monomeric complex of the present invention the number of $NH_2$ groups is equal to the sum of the valences of the alkali metal and non-alkaline metal. From this, therefore, it is possible to determine the amount of the source of $NH_2$ groups to be introduced into the reaction medium. Due to the inevitable loss of some ammonia, however, it will be desirable to include within the reaction medium an excess amount of the source of $NH_2$ groups based upon the proposed formulation. This will assure that sufficient $NH_2$ groups will be present to complex with the alkali metal and non-alkaline metal in the formation of the inorganic monomeric and polymeric complexes of the present invention.

Reaction Dynamics

The reaction dynamics of the method of the present invention will be described primarily with regard to model systems based upon silicon/sodium and silicon/-potassium. It should be recognized, however, that the reaction dynamics set forth for these models will be typical of a substantial number of the non-alkaline metals of groups I–VIII of the periodic table encompassed within the description given above. Where applicable, specific mention will be made of those metals which deviate to some extent from the silicon/sodium and silicon/potassium model to be discussed. Failure to mention a specific metal, however, should not necessarily be taken as an indication that the metal will precisely track the silicon model. The reaction dynamics for any particular metal system or combination of metals can be easily determined by one of ordinary skill in the art through routine experimentation.

The reaction dynamics of the method of the present invention will be illustrated by reference to FIG. 1. Utilizing silicon as a model non-alkaline metal, the curves shown represent two systems, a silicon/sodium system and a silicon/potassium system. Referring first to the silicon/sodium system, FIG. 1 includes three main curves. The first comprises a temperature profile curve, which also corresponds to the silicon metal erosion in the reaction medium. This curve plots the temperature of the reaction system and the erosion of the silicon metal as a function of time in hours. A second curve plots the $NH_3$ content and consumption in this silicon/sodium system, also as a function of time in hours. The final curve relating to the silicon/sodium system involves a plot of the sodium hydroxide content and consumption against time in hours.

It will be observed, in connection with the temperature curve, that there is an initial rise in temperature upon the introduction of the sodium hydroxide into the aqueous medium (which in the case of the reaction represented, already includes aqueous ammonia and silicon metal). This initial rise in temperature is probably due to the exothermic heat of solution as the sodium hydroxide pellets are dissolved in the aqueous reaction medium. In addition, the introduction of the sodium hydroxide pellets into the aqueous reaction medium effects a release of $NH_2$ groups from the aqueous ammonia. This reaction is also exothermic, further giving rise to the initial slight increase in temperature of the reaction medium. For example, the temperature may rise from an initial room temperature of approximately 75° F. to a temperature of 80°–90° F. during the initial introduction of the sodium hydroxide.

The erosion of the silicon metal is also exothermic. The intensity of each of these exothermic reactions, however, lags that of the endothermic reaction, which is associated with the formation of molecular bonds and is theorized to result principally from the formation of water from the reaction of released hydrogen ions and free hydroxy radicals supplied by the alkali metal hydroxide binding or tying up of the released $NH_2$ groups, perhaps initially in the form of an alkali metal (i.e., sodium) amide, definitely as a complex with the alkali metal and the eroded silicon, most likely a combination of both. As a result, a natural endotherm is created, and shortly after the initial increase in reaction temperature due to the initial introduction of the sodium hydroxide, the temperature of the reaction medium begins to cool, leveling off as illustrated over a period of hours. While the degree of the endothermic phase of the reaction depends on many factors, particularly including the rate of erosion of the silicon, it has been found in accordance with the present invention that an endothermic phase cooling of the reaction medium to as low as 40°–50° F. can be achieved. It must be recognized that this endothermic phase is achieved in accordance with the model illustrated without any external cooling of the reaction medium.

Generally, the introduction of the sodium hydroxide should be completed in approximately two to four hours, although longer periods can be successfully employed. The addition of the alkali metal hydroxide is carried out in such manner as to create, immediately adjacent the non-alkaline metal, localized areas of high alkali metal hydroxide concentration at very high pH, approaching pH 14. An intimate contact relationship is thus developed between the alkali metal hydroxide and non-alkaline metal, establishing effective non-alkaline metal erosion and effective release and binding up of reactive $NH_2$ groups.

At this point in the reaction there will be sufficient sodium ions in solution in the reaction medium to bind with and tie up the released $NH_2$ groups. During the entire period of the endothermic phase of the reaction, therefore, there are competing exothermic and endothermic reactions, with the exothermic reactions, principally the erosion of the silicon metal, lagging the endothermic reactions, principally water formation and the formation of metal and multi-metal amides.

As indicated previously, the reaction of the present invention is accompanied by hydrogen evolution. If the reaction proceeds to rapidly and the hydrogen evolution occurs to such an extent as to carry the alkali metal hydroxide out of intimate contact with the non-alkaline metal, the reaction will not proceed as desired. As a result, the incremental feed of alkali metal hydroxide should be carried out in a manner so as to maintain the desired contact and the localized areas of high pH.

If the alkali metal hydroxide is fed to the reaction system at too fast a rate, substantial amounts of ammonia will be released from the reaction system and there will be insufficient erosion of the non-alkaline metal. Accordingly, there will be insufficient production of the inorganic monomeric complex. This reaction can be placed on a proper course by accelerating the erosion of the non-alkaline metal, such as by heating the reaction system. The non-alkaline metal which erodes will then bind with the alkali metal ions, remaining $NH_2$ groups and alkali metal amides formed by reaction of the two.

On the other hand, if the feed of the alkali metal hydroxide is too slow, and as a result, there is insufficient $NH_2$ group formation and hydrogen release, the eroded non-alkaline metal tends to bind with the alkali metal in the form of a salt, such as sodium silicate. When this occurs, it does not appear possible to reverse the reaction to achieve the production of the desired complexes.

At some point after the reaction has continued in its endothermic phase for a period of time, a natural exothermic phase is entered. This appears to be due to the energy course of the exothermic reactions overtaking and passing the endothermic reactions. Presumably, the initiation of the exothermic phase of the reaction coincides with a decrease in metal amide production, resulting from the binding or tying up of substantially all available $NH_2$ groups and/or available sodium ions. From this point in the reaction, the exothermic reactions, erosion of the silicon metal and breaking up of $NH_2$ groups and formation of metal hydride linkages in the polymerizing monomeric complex, begin to predominate and the temperature of the reaction medium starts to increase. As the temperature of the reaction medium increases, the erosion of the silicon metal also increases since the erosion rate is affected by the temperature achieved using the silicon/potassium system, the use of the less active potassium hydroxide in the method of the present invention has the effect of drawing out or lengthening the endothermic phase of the reaction, presumably due to a decrease in the erosion rate of the silicon metal. As a result, instead of a 6 or 7 hour endothermic phase, all other factors being maintained constant, the endothermic phase using the potassium hydroxide is extended to 20 to 24 hours. The exothermic phase occurs at approximately 24 hours after the initiation of the reaction. Again, this exothermic phase is characterized by a temperature rise to a peak of approximately 260° F. Once the exothermic phase is initiated and the erosion of the metal leads the endothermic reactions, the exothermic phase takes off quite quickly due to the "snowballing" effect associated with increased erosion of the silicon metal and hydride formation, with increasing temperature. This exothermic phase in the silicon/potassium system is also lengthened when compared to the exothermic phase of the silicon/sodium system.

The above discussion concerning the reaction dynamics involving the silicon metal system in which a natural endothermic phase and a natural exothermic phase are achieved is applicable to a great number of non-alkaline metals of groups I–VIII of the periodic table, utilized in accordance with the method of the present invention. For example, similar natural endothermic phase and a natural exothermic phase is achieved when utilizing such metals as aluminum, gallium, beryllium, zinc, titanium and zirconium. As indicated previously, however, certain applicable non-alkaline metals are less reactive than the model silicon metal and, as a result, it is often necessary to provide some external influence upon the development of the endothermic and exothermic phases of the reaction. Included within this latter group of metals are tin, tantalum, copper, bismuth, titanium and the other refractory metals, nickel and the nickel group metals, and cadmium.

With these and similar less reactive metals, it may be necessary, in order to either initiate, accelerate or maintain the endothermic phase of the reaction, to provide external cooling of the reaction medium. Similarly, for some metals it may be necessary, in order to develop and/or accelerate the exothermic phase, to slightly heat the reaction medium. This heating should be carried out in a uniform manner. Heating of the reaction medium to a temperature of about 180° F to about 220° F will generally be satisfactory to develop and accelerate the exothermic phase. Here again, it should be recognized that due to the increased erosion of the non-alkaline metal with increased temperature, the exothermic phase will develop through this heating.

In the alternative to cooling the reaction medium to develop the endothermic phase, or heating the reaction medium to develop the exothermic phase, there are other available procedures when utilizing a less reactive non-alkaline metal. For example, as has been explained earlier, since the reactivity of the non-alkaline metal is to some extent a function of the surface area of this non-alkaline metal, increased reactivity can be achieved by increasing the surface area of the non-alkaline metal. This can be done by providing the non-alkaline metal in smaller particle size or in greater amount. Again, however, it should be recognized that care should be taken in utilizing a powdered metal in the method of the present invention. This is due to the fact that in some instances the powdered metal becomes too reactive, not allowing for the controlled development of an endothermic phase, and in other instances, a polarization of hydrogen occurs, making the non-alkaline metal even less reactive.

Taking advantage of the fact that the method of the present invention is applicable to so many different metals, a very effective way of increasing the reactivity of the less reactive metals is the including within the reaction system of a minor amount of a more reactive metal, such as, silicon, aluminum, gallium, and the like. In this respect, it has been determined that even amounts as small as 0.01% of this more reactive metal can increase the reactivity of a less reactive non-alkaline metal. Of course, since more than one metal is applicable in accordance with the present invention, there is no upper limit in terms of the amount of the more active non-alkaline metal which can be added to the reaction medium. Also, the addition of almost any second non-alkaline metal, even as an impurity in the first non-alkaline metal seems to increase the reactivity of the non-alkaline metal through an anodic reaction.

When increasing the reactivity of a less reactive non-alkaline metal through the addition of a more reactive non-alkaline metal, it has been found advantageous to use as the more reactive metal a non-alkaline metal which has been previously used in a reaction carrying out the method of the present invention. That portion of the non-alkaline metal remaining after carrying out the method of the present invention, upon its removal from the reaction medium, is found to be even more reactive in carrying out further reactions. In fact, since even the less reactive non-alkaline metals become more reactive after being utilized in carrying out the method of the present invention, some of the less reactive non-alkaline metal which has been put through the instant method can be used to accelerate the reactivity of the same non-alkaline metal in future reactions. This procedure would eliminate the possibility of introducing an impurity into the inorganic monomeric complex or inorganic polymeric complex as a second metal, where no second metal is desired.

This latter phenomenon can also be used to advantage in another respect. As has been previously indicated, certain less reactive non-alkaline metals, as well as non-reactive metals of very small particle size, tend to polarize hydrogen on the surface of the metals, thereby decreasing the reactivity of such metals in the method of the present invention. This polarization can be eliminated or substantially reduced by the addition to the reaction medium of a small portion of a more reactive non-alkaline metal as discussed above. In the alternative, an electric current can be applied to the non-alkaline metal to eliminate this polarization. By eliminating this polarization effect, the less reactive non-alkaline metal will again become more reactive in the reaction of the present invention.

Finally, where a less reactive non-alkaline metal is utilized, there is a greater tendency for ammonia to escape from the reaction system since there is less eroded metal to complex with and thereby tie up the released $NH_2$ groups. Under such circumstances, the endothermic phase of the reaction of the present invention can be accelerated by utilizing a continuous supply of ammonia gas either to supplement the aqueous ammonia reactant or as a replacement thereof. By providing this supply of ammonia gas, it becomes possible to always maintain sufficient ammonia in the system. The problems created by excessive ammonia loss can also be prevented by carrying out the method of the present invention under reflux conditions wherein any ammonia which escapes is returned to the reaction medium. This can be achieved with reflux, such as dry ice reflux.

Referring again to the model system of FIG. 1, there is also illustrated the alkali metal hydroxide consumption in this same system. It can be noted by reference to FIG. 1 that the consumption of both sodium hydroxide and potassium hydroxide in the system occurs primarily during the endothermic phase of the reaction. This is consistent with the proposed explanation of the reaction dynamics which suggests that the sodium ions tie up or bind with released $NH_2$ groups and eroded metal during the endothermic phase of the reaction. Accordingly, under ideal conditions when the reaction process is controlled so as to maintain an endothermic phase, substantially all of the alkali metal ions should be consumed. It is, of course, possible that some free alkali metal ions will not bind with the released $NH_2$ groups and eroded metal and will appear as free ions in the final product.

FIG. 1 also illustrates ammonia content and consumption in both the silicon/sodium system and silicon/potassium system. It should be recognized that, in the embodiment illustrated, the reaction is initiated with aqueous ammonia already present in the reaction system. Accordingly, the dynamics which are illustrated in FIG. 1 pertain to such system wherein a maximum ammonia content is present at the initiation of the reaction, with this amount steadily declining as the reaction proceeds. It should be apparent, however, as previously indicated, that the ammonia content in the reaction system can be supplemented or that a steady flow of ammonia gas can be utilized in lieu of the aqueous ammonia. Under these circumstances, the reaction dynamics as they pertain to ammonia content and consumption will be greatly different than that illustrated in FIG. 1.

As illustrated in FIG. 1, there is a steady decline in the free ammonia content in the model system. While not illustrated, the decline in the free ammonia content is accompanied by an increase in the available $NH_2$ content in the reaction system. This is consistent with the proposed theory that the introduction of the alkali metal hydroxide liberates free $NH_2$ groups which, in turn, are bound up with the alkali metal ions and/or the eroded metal ions from the non-alkaline metal. As illustrated, the free ammonia content of the model reaction system is substantially depleted at the initiation of the exothermic phase of the reaction. In this respect, under optimum conditions, as the reaction system enters its exothermic phase all of the ammonia will be in the form of reaction $NH_2$ groups which are substantially bound in the inorganic monomeric complex and no free ammonia will be expelled as the exothermic phase is entered. Moreover, as previously indicated, the addition of the alkali metal hydroxide is controlled in accordance with the reaction dynamics of the present invention to minimize as much as possible any expulsion of free ammonia from the reaction system. Again, this effect can be enhanced in accordance with the present invention by utilizing a reflux system and/or by supplementing the aqueous ammonia with ammonia gas.

The above explanation with respect to FIG. 1 and the reaction dynamics of the present invention has dealt principally with silicon/sodium and silicon/potassium systems. As previously noted, similar reaction dynamics are applicable for other nonalkaline metals. Substantially all of the nonalkaline metals of groups I–VIII of the periodic table show similar reaction dynamics, although some modification of the reaction parameters may be necessary to insure proper development of the endothermic and/or exothermic phases of the reaction.

With respect to the alkali metal hydroxide, it is emphasized that in addition to the applicability of sodium hydroxide and potassium hydroxide, the process of the present invention is applicable as well to the other alkali metal hydroxides. In addition, as was also indicated previously, all or a portion of the alkali metal hydroxide may be replaced with an alkaline earth metal hydroxide, such as calcium, barium or strontium hydroxide. These alkaline earth metal hydroxides are however, less active than the illustrated potassium hydroxide, thereby tending to draw out both the endothermic phase and exothermic phase of the reaction. Because of the rather low activity of these alkaline earth metal hydroxides, their use is not preferred.

Lithium hydroxide, while useful in the reaction, has low solubility in an aqueous ammonia medium. Therefore, it is generally necessary to dissolve all or some of the lithium hydroxide in water before introduction into the reaction system. This inhibits to a large degree the successful utilization of lithium hydroxide pellets or other solid form, and the development of the localized areas of high concentration and high pH.

As a result, if lithium hydroxide is employed as the alkali metal hydroxide, it is generally necessary to increase the rate of reaction, such as through supplementary ammonia gas or immersed surface area of the non-alkaline metal.

The remaining alkali metals behave roughly equivalent to the alkaline earth metals when utilized as the alkali metal hydroxide in the reaction of the present invention. Here again, therefore, due to the low reactivity of these alkali metal hydroxides, their use is not preferred. The preferred alkali metal hydroxides for effectively carrying out the method of the present invention are sodium hydroxide and potassium hydroxide. With the use of these alkali metals, a substantial number of non-alkaline metals of groups I–VIII of the periodic table achieve a natural endothermic phase. Accordingly, with respect to the experimental work which will be discussed hereinafter, principal activity has been with sodium hydroxide and potassium hydroxide.

Referring again to the model systems illustrated in FIG. 1, this figure further plots the overall pH of the reaction system as a function of time, specifically with regard to the illustrated silicon/sodium system. As illustrated, the pH of the reaction system is intially about 11.5 based upon the initial presence of aqueous ammonia. The pH rises upon the addition of the alkali metal hydroxide (in this case, sodium hydroxide), but then lowers again, tends to level off and is thereafter generally maintained within the range of about pH 11.5 to pH 13, preferably pH 12.5 to pH 13.

The lowering of the pH, after it initially rises upon the addition of the alkali metal hydroxide, is clearly due to the complexing of the alkali metal and the $NH_2$ groups, with the concurrent formation of water and release of hydrogen to the system, during the endothermic phase of the reaction. It should be understood however, based upon the previous explanation of reaction parameters, that while the pH of the overall system is an important indicator of the manner in which the reaction is proceeding, it is nevertheless essential to the initiation and maintenance of the endothermic reaction phase that the system contain localized areas proximate to the non-alkaline metal wherein the pH approaches a value of 14.

Proposed Structures

Throughout the foregoing and following description, reference has been made to the production through the methods of the present invention of "an inorganic monomeric complex" and "an inorganic polymeric complex." The term complex is used because the structural configurations of these products have not been precisely determined. However, extensive analysis has been conducted which has established the monomeric and polymeric nature of the products and the presence of certain functional groups. In view of the difficulty in precisely determining the structural configuration of monomeric and polymeric products, particularly when obtained through complex chemical reactions, the expressions inorganic monomeric complex and inorganic polymeric complex are deemed aptly descriptive of the products produced by the method of the present invention.

During the endothermic phase of the reaction, the alkali metal hydroxide, as it is introduced into the reaction system, first acts to release $NH_2$ groups from the source of $NH_2$ groups. Thereafter, the combined presence in the system of the reactive $NH_2$ groups and the alkali metal and hydroxide ions appears to cause an erosion of the non-alkaline metal, bringing into solution metal ions. It appears that this erosion effect is due to the formation, in an intermediate reaction, of relatively unstable alkali metal amides, probably by reaction between the alkali metal ions and released $NH_2$ groups. These alkali metal amides, in turn, react with the non-alkaline metal to form the inorganic monomeric complexes of the present invention. This last reaction is demonstrated physically by erosion of such non-alkaline metals which do not ordinarily erode easily or become soluble in the aqueous alkali medium.

It is postulated, therefore, that during the endothermic phase of the reaction an inorganic monomeric complex is formed which includes the alkali metal ions, ions of the non-alkaline metal and $NH_2$ groups. Based upon extensive analysis, a formula for this inorganic monomeric complex has been developed, which can be empirically written as follows:

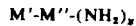

Wherein M' is the alkali metal, M" is the nonalkaline metal of groups I–VIII of the periodic table and y is the sum of the valences of M' and M".

As previously indicated, it has been found that, in the inorganic complexes formed in accordance with the present invention, the non-alkaline metal tends to assume its lowest valence state. Accordingly, y in the above generic formula would in most instances comprise the sum of the valences of the alkali metal and lowest valence state of the non-alkaline metal. For example, in terms of the metal system of FIG. 1, the formula for the inorganic monomeric complex in the silicon/sodium system can be written as follows:

Where, as has been mentioned earlier, it is necessary or desired to employ more than one non-alkaline metal of groups I–VIII of the periodic table, the sum of the valences should be calculated using an "apparent," or average, valence of the non-alkaline metals. It should be recognized, however, that when two or more different non-alkaline metals are employed, it is also possible that different monomeric complexes will be formed, each including only one non-alkaline metal in its structure.

The exothermic phase of the reaction of the present invention appears to be characterized by a breaking down of the $NH_2$ groups, together with a polymerization of the inorganic monomeric complexes. This breaking down of the $NH_2$ groups is not complete, however, and so polymerization is accompanied by the formation of NH groups and hydride groups within the inorganic polymeric complex. Referring again to a generic formula, physical-chemical analysis of the inorganic polymeric complex suggests a structure as follows:

Wherein M' again represents the alkali metal, M" represents one or more non-alkaline metals of groups I–VIII of the periodic table, x represents the total valence of M' and M" and n represents the numbers of repeating units in the inorganic polymeric complex.

While the above formula illustrates the presence of NH and H groups in the structure of the inorganic polymeric complex, this illustration is presented on the basis of a presumed preponderance of these groups. It is quite probable that in addition to NH and H groups the inorganic polymeric complex will contain $NH_2$ groups which are not broken down in the exothermic phase of the reaction as well as hydride groups resulting from the further breaking down of NH groups. In addition, since the inorganic polymeric complex is formed in an aqueous medium, there is also the possibility that hydroxy groups and/or hydroperoxy groups will appear in the structure of the inorganic polymeric complex. These latter groups will generally be present when utilizing $NO_x$ or nitric acid as the source reactive of $NH_2$ groups. Accordingly the above proposed structure is deemed merely illustrative of what would appear to be a predominant unit of the inorganic polymeric complex and its presentation is in no way intended to exclude other groups, as described above.

As has been alluded to, during the exothermic phase of the reaction, there appears also to be considerable formation of the hydride of the non-alkaline metal, represented by the formula $M''H_z$, wherein $z$ is the valence of the non-alkaline metal. If the exothermic phase is allowed to continue with excess non-alkaline metal maintained in the reaction system, greater amounts of the hydride will be formed. Eventually even the hydride will break down, resulting in the formation of elemental metal, possibly even metal oxide within the inorganic polymeric complex. A completely solid reaction mass will result if the reaction is carried substantially beyond the exothermic phase in the presence of additional non-alkaline metal.

As indicated previously, it has been observed that any non-alkaline metal which is removed from the reaction system following the exothermic reaction is more active in subsequent reactions than it had originally been prior to its use in the method of the present invention. The reason for this is not fully understood, although it does appear that this increased reactivity is associated with either the presence of a small quantity of the inorganic polymeric complex remaining in the removed non-alkaline metal and/or the presence of a non-alkaline metal hydride permeated through this non-alkaline metal.

With certain non-alkaline metals, the excess metal which is removed from the reaction medium following the exothermic reaction of the present invention has several other properties not generally associated with the non-alkaline metal in its original form. Using silicon as a typical example, the silicon metal removed from the reaction medium after the exothermic reaction will have a sponge-like appearance, different from the appearance of the original silicon metal. In addition, this silicon metal removed from the reaction medium will have the property os disassociating water, a property which may be explained by the presence of active hydrogen within the silicon metal, presumably due to its permeation with silicon hydride. While certainly not wishing to be bound by any explanation, it appears that it can be conclusively said that the non-alkaline metal which is removed from the reaction medium of the present invention subsequent to the exothermic reaction is altered in physical characteristics from the original non-alkaline metal.

The reaction of the present invention yields both the inorganic monomeric complex and the inorganic polymeric complex as stable water solutions. In this respect, both complexes are soluble in water and stable in the alkaline solution in which the complexes are formed. The solutions are clear and transparent. The solution of the inorganic polymeric complex is quite viscous. The transparency of this solution indicates that the inorganic polymeric complex includes a linear polymer. While the viscosity of the polymeric solution is, to some extent, dependent upon the amount of water which is present, it is also clearly an indication of molecular weight. The viscosity can vary from a viscosity similar to that of water itself to a highly viscous type of material which pours very slowly. In addition, as previously noted, if the exothermic reaction is carried further, a totally solid product is produced. Generally, the specific gravity of this polymer solution will range up to about 2.2. Here again, the specific gravity is dependent upon many variables and specific gravities outside this limit can easily be achieved.

A unique characteristic of the inorganic polymeric complex is the ability to reverse the polymerization reaction and develop a further exothermic phase and repolymerization. This can be done by reacting the inorganic polymeric complex with ammonia, i.e., aqueous ammonia or ammonia gas, thereby driving the polymeric complex back to a monomeric state. This is consistent with the proposed theory that in the inorganic monomeric complex there is a preponderance of $NH_2$ groups, these $NH_2$ groups breaking down into NH and H groups when going from the monomeric state to the polymeric state. Reaction of the NH groups with ammonia yields $NH_2$ groups.

This reversing ability is a valuable process control feature. It can be successfully utilized to load the inorganic polymeric complex with a greater amount of non-alkaline metal than is achievable in the initial exothermic reaction. For example, if after reversing the polymerization additional non-alkaline metal is added to the reaction medium, a new exothermic phase can be established which will increase the non-alkaline metal content of the complex. This is of particular value where the ratio of non-alkaline metal to alkaline metal must be increased, as is producing inorganic polymeric complexes for gem stone preparation.

The polymeric nature of the inorganic polymeric complex becomes especially apparent when the polymeric complex is dehydrated. The solid residue which is formed remains transparent, hard, horny (although plastic in nature) and is hygroscopic. When this solid is re-dissolved in water a clear viscous solution similar to the original solution of the inorganic polymeric complex results.

Since the inorganic polymeric complex is soluble in water, it can be diluted with water for a number of applications. For example, in the field of metal plating, both electroless plating and electrical plating, it is generally advantageous to dilute the polymer solution with water to provide a less viscous solution for plating purposes.

As stable as the aqueous solutions of the inorganic polymeric complex are, when acidified with acid, the polymeric structure appears to be destroyed, forming a solid gel. This solid gel forms a salt-like deposit when dehydrated. When the dehydrated solid gel is re-dissolved in water there is no similarity whatsoever between this solution and the original viscous inorganic polymeric solution. Accordingly, while the inorganic polymer solution is stable in alkaline medium, acid medium appears to destroy its polymeric nature.

To identify the functional groups in the structures of the inorganic monomeric and polymeric complexes, infra-red spectroscopy analysis was carried out on various samples. Again, principal analytical work was carried out with respect to the model systems utilizing silicon and sodium, and silicon and potassium. The infra-red curves developed in this analysis are set forth in the accompanying drawings 4–25, with FIG. 2 comprising an identifying chart superimposed upon an infrared chart to illustrate the characteristic groups which have been observed in the inorganic monomeric and polymeric complexes. These groups as well as other groups specifically characteristic of the silicon products can be found in the following table.

| Group Identification | | | |
|---|---|---|---|
| | | Absorption | |
| Group | Intensity | Wave length (microns) | Wave number (cm$^{-1}$) |
| -NH$_2$ | medium | 2.9–3.2 | 3448–3125 |
| | strong | 6.1–6.5 | 1639–1538 |
| | medium | 8.8–9.6 | 1136–1042 |

-continued

| Group Identification | | | |
|---|---|---|---|
| | | Absorption | |
| Group | Intensity | Wave length (microns) | Wave number (cm$^{-1}$) |
| N-H | strong | 10.8-14.0 | 926-714 |
| | medium | 2.9-3.3 | 3448-3030 |
| | weak | 6.3-6.8 | 1587-1471 |
| Si-H | medium | 8.8-9.4 | 1136-1064 |
| | very strong | 4.3-4.8 | 2326-2083 |
| N-H stretch | | 2.7-3.3 | 3704-3030 |
| N-H bend | | 6.1-6.7 | 1639-1493 |
| N-H rock | | 11.1-14.2 | 901-704 |
| Si-O | strong | 9.2-9.5 | 1087-1053 |
| Silicates | very strong | 9.0-11.1 | 1111-901 |
| Carbonates | | 6.9-7.1 | 1149-1408 |
| | | 11.4-11.6 | 877-862 |

Turning to the figures, FIG. 3 represents the I.R. scan of a silicon/sodium complex after the endothermic phase of the reaction. The sample was introduced into the spectrophotometer as a capillary film. In addition to the hydroxyl groups of water present, the I.B. scan illustrates the presence of NH$_2$ groups in the monomeric complex. Again, reference can be made to FIG. 2 and the above table.

FIG. 4 is an I.R. scan of the same silicon/sodium polymer vacuum-dried at 80° C. The sample was a cast film on a cesium iodide window. Again, the characteristic peaks identifying the silicon hydride, NH$_2$ group, NH group and their secondary and tertiary vibrations are illustrated. Again, groups such as the hydroxyl group from water, and impurities also appear in these infra-red scans.

Figure 5:
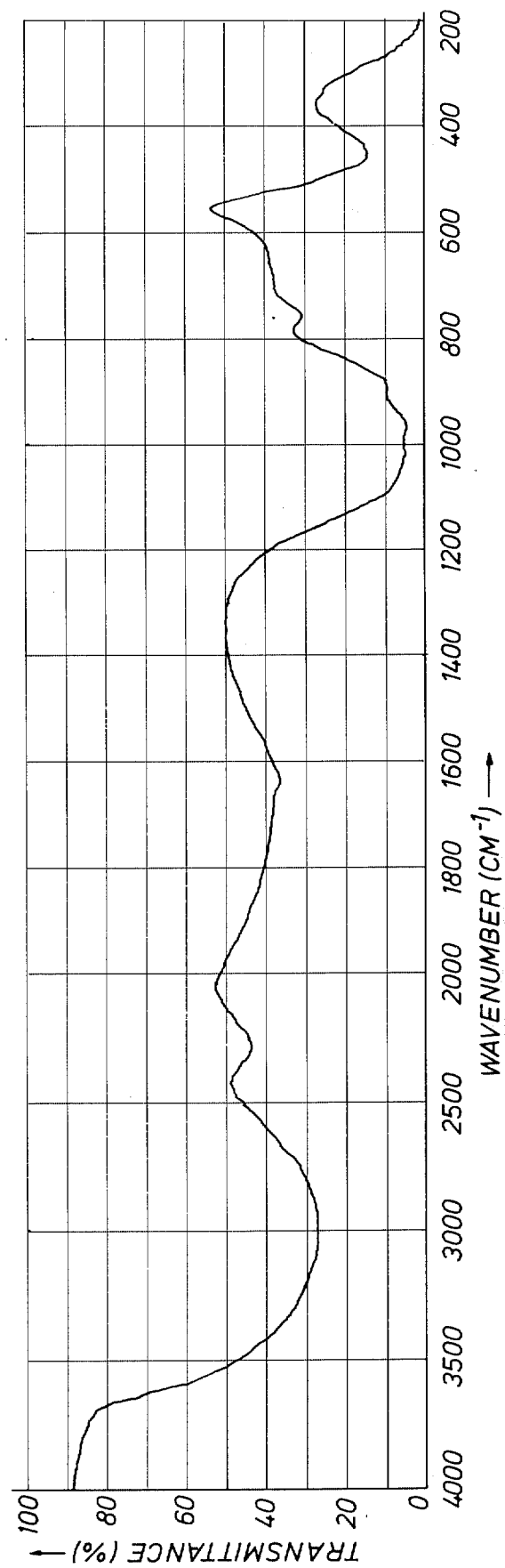
FIG. 5 is an infra-red scan of a Si-K liquid system after the exothermic phase of reaction.

FIGS. 5 and 6 are respectively I.R. scans of a silicon/potassium polymeric complex after the exothermic phase, FIG. 5 being a scan of the liquid polymeric complex, with figure 6 being a scan of the solid dehydrated polymeric complex. Both samplings were introduced as cast films of cesium iodide windows. When these infra-red scans of FIGS. 5 and 6 are compared, for example, to the infra-red scan of FIG. 3, i.e., a silicon/sodium monomeric complex after the endothermic phase, it can be seen that in the exothermic phase of the reaction the number of NH$_2$ groups has decreased and the Si-H and N-H groups have increased relatively. This supports the hypothesis stated above that during the exothermic phase of the reaction, a substantial number of NH$_2$ groups are converted to hydride and N-H groups.

FIGS. 7-10 comprise a series of infra-red scans illustrating the stability of the functional groups with respect to heat. FIG. 7 is an infra-red scan of a silicon/sodium inorganic polymeric complex after the exothermic phase of the reaction, illustrating the presence of Si-H, NH$_2$ and NH groups. While the amount of NH$_2$ groups is reduced in the polymeric complex as compared to the monomeric complex resulting after the endothermic phase of the reaction, a significant amount of NH$_2$ groups still exists. FIG. 8 is an I.R. scan of the same silicon/sodium polymeric complex, this polymeric complex being a solid dehydrated polymer, dried at 93° C. A review of this scan indicates that the greater proportion of the NH$_2$ groups present is not affected by this heating. The I.R. scan of FIG. 9 was taken of the solid dehydrated product, heated and dehydrated at 232° C. When reviewing this scan it is noted that a considerable amount of the NH$_2$ groups have been removed from the inorganic polymeric complex through this heating. Finally, FIG. 10 is an I.R. scan of the same silicon/sodium inorganic polymeric complex heated and dehydrated at 1093° C. A review of this scan indicates that most of the NH$_2$ functional groups have been eliminated.

FIGS. 11-23 are infra-red scans of other non-alkaline metals of groups I-VIII of the periodic table, with sodium or potassium. These I.R. scans will be related to specific inorganic polymeric complex preparations in the later given examples. Similarly, FIGS. 24 and 25 represent further I.R. scans of silicon/sodium inorganic polymeric complex, specifically prepared with reduced alkali metal content, for the particular application of gem stone preparation. These I.R. scans again will be discussed further in connection with later given examples.

Figure 26:
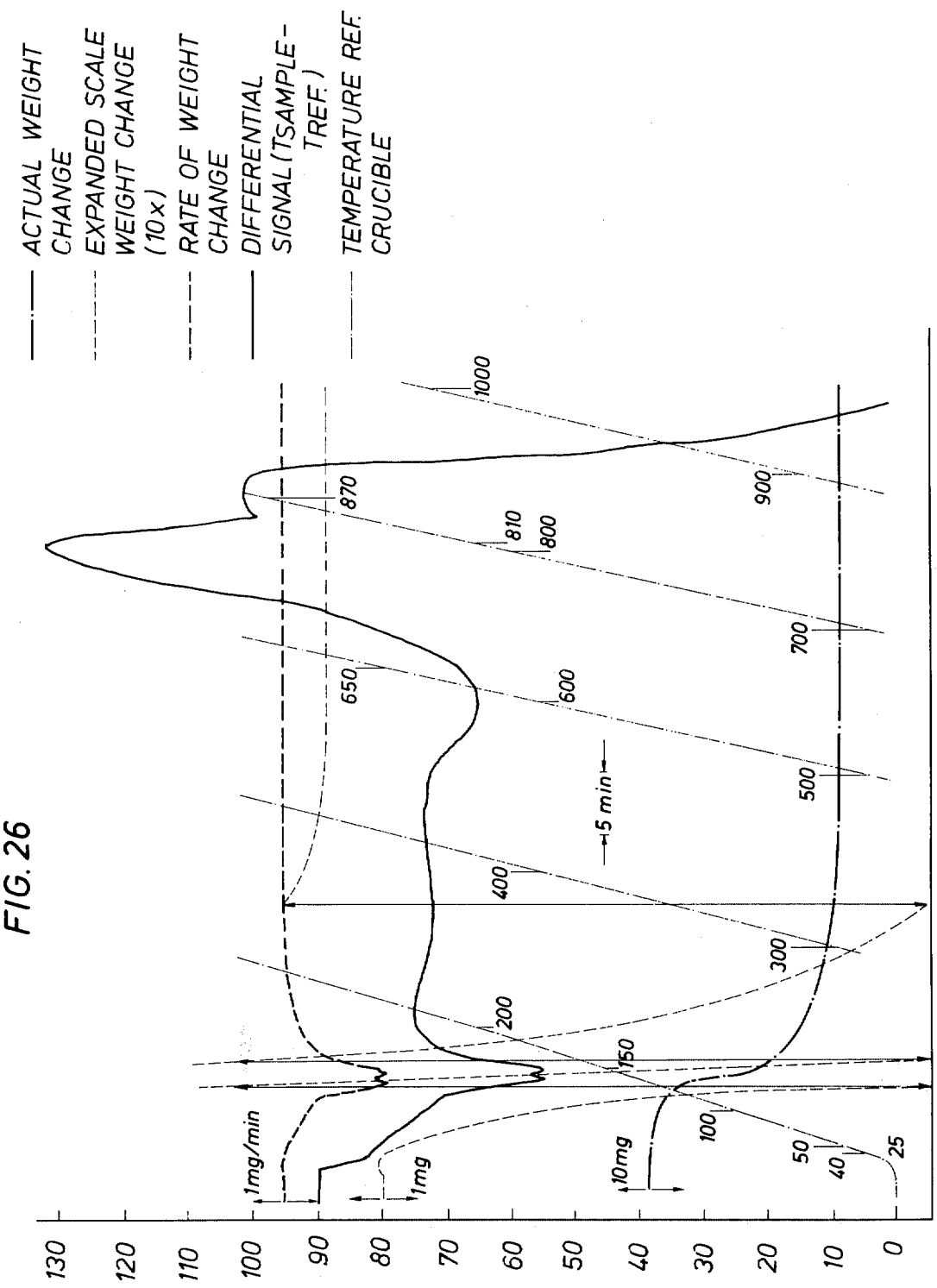
FIG. 26 is a thermogravimetric curve over the range of 25°–1000° C. for a Si-Na system of the present invention.
Figure 27:
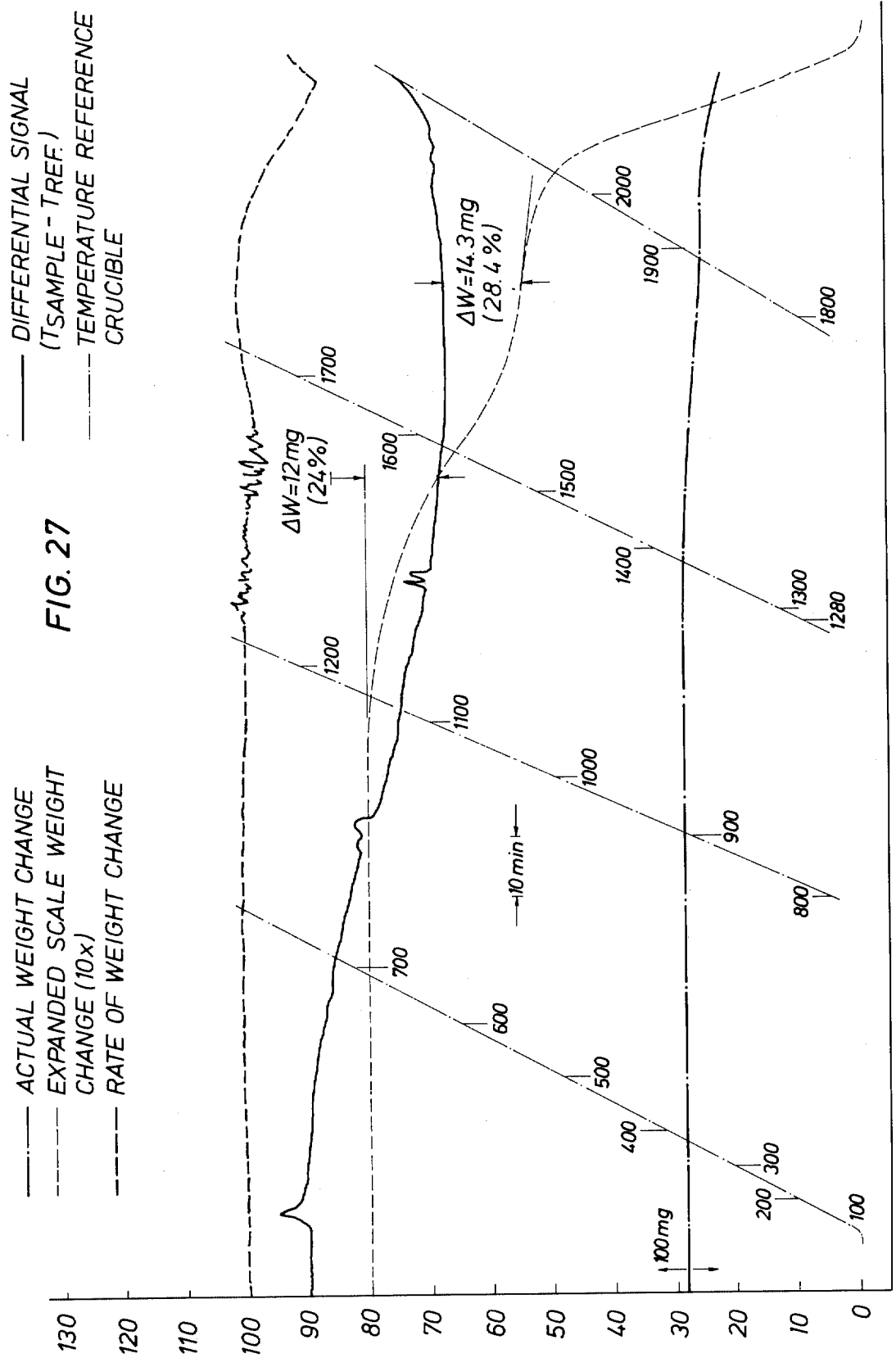
FIG. 27 is a thermogravimetric curve of the Si-Na system of FIG. 26 over the temperature range of 900°–2300° C.

Thermogravimetric analysis was conducted with respect to the inorganic polymeric complex of the present invention in order to develop further information concerning the structure of the inorganic polymeric complex by observing and analyzing the gases which are driven of during heating. The thermo-analytical behavior of the inorganic polymeric complex is illustrated in FIGS. 26 and 27. In preparing the charts of FIGS. 26 and 27, 8 mm diameter crucibles were used, the crucibles being tungsten cups of 20 mm height. To prevent loss of the sample material, a fairly low heating rate of 4° C. per minute was utilized.

It can be seen from FIGS. 26 and 27 that upon heating of the inorganic polymeric complex gas release can be observed at four different temperatures. At the point where gas is first released, occurring between 25° C. and 400° C., the inorganic polymeric complex foams and large quantities of gas are given off. The weight loss in this first degassing phase is largely in the form of H$_2$O which comes off at about 120° C. Other unidentified gases start coming of at 120° C., gradually tapering off at 400° C.

During the second degassing phase, occurring at approximately 600° C., the polymer re-foams and then collapses. At this point there appears to be some further, but slight, weight loss. These first and second degassing phases are seen in FIG. 26 which represents the initial behavior of the sample over the temperature range of 25°-1000° C.

More specifically with regard to FIG. 26, the expansion which occurred was due to an endothermic single weight loss process which started at 40° C., obtaining a maximum rate at 135° C., and concluding at 200° C. A broad exotherm is seen at about 650° C. This peaks starts at 810° C. and is concluded at 1000° C. Since there is no appreciable weight loss accompanying this, it is indicative of the formation of a glassy solid, somewhat akin to the "curing process" in organic polymer systems.

Referring now to FIG. 27, a third degassing phase is seen, taking place at about 1300° C., at which point the inorganic polymeric complex loses a substantial amount of weight. It has been observed that nitrogen and hydrogen are driven off at this point. At the fourth degassing phase, occurring at 1580° C., further large amounts of gas are driven off. This is in the form of hydrogen. If the temperature continues to be elevated further (to approximately 2500° C.), the remainder of the polymer is completely vaporized. Looking at FIG. 27 in more detail, a small irregular exotherm is seen at about 900° C. At 1100° C. a weight loss process commences and from 1280° C. to 1600° C. a "gas bubbling" phenomena occurs, as mirrored in the 10X expanded weight change scale and magnified in the rate of weight loss trace. During this period there is about a 24% weight loss, followed immediately by about a 28% weight loss. At 1900° C. a large weight loss occurs. At 2300° C. all the sample has volatilized.

Based upon the results of the thermogravimetric analysis, it is postulated that at 135° C. any water remaining after the exothermic phase of the reaction is released along with NH groups. At 600° C. the water of crystallization is released, and at 1300° C. the remaining NH groups are released. Finally, at 1580° C. the hydrogen from the hydride groups present in the inorganic polymeric complex is released.

In a further study using mass spectroscopy it has been observed that nitrogen and atomic hydrogen are released by the inorganic polymeric complex. The atomic hydrogen appears to be released from room temperature through 1550° C. The nitrogen is released at 875° C.

As previously indicated both the inorganic monomeric complex and inorganic polymeric complex of the present invention have a variety of uses. For example, the inorganic monomeric complex can be utilized in the preparation of soaps and bleach formulations in accordance with applicant's co-pending application Ser. No. 534,084, filed Dec. 23, 1974. For example, a suitable soap can be prepared by reacting the inorganic monomeric complex with a fatty acid, through a reaction mechanism in which the fatty acid moiety replaces an $NH_2$ group of the inorganic monomeric complex. Reaction of hydrogen peroxide with the inorganic monomeric complex either with or without a fatty acid, produces a useful bleach product as a result of this presence of hydroperoxy groups in the final reaction product. Hydroperoxy groups can be introduced into the inorganic monomeric complex even without the separate reaction with hydrogen peroxide. This occurs naturally when utilizing nitric acid or $NO_x$ gas as the source of $NH_2$ groups in the production of the monomeric complex. The additional presence of oxygen in the reaction system tends to bring about the formation of hydroperoxy groups which are introduced into the main structure of the inorganic monomeric complex. Accordingly, it should be understood that the description of the inorganic monomeric complex as used throughout is meant to embrace such products which include hydroperoxy groups.

The inorganic polymeric complexes of the present invention have various utilities as a result of the unique characteristics of this inorganic polymeric complex. This is particularly true with regard to the apparent presence of free electrons and hyrogen ions within the complex. For example, the unique electrical properties of the complex make them effective liquid or fluidic capacitors, or diodes. While the ability of the inorganic polymeric complex of the present invention to act in the foregoing manner is not precisely understood, it is believed that the ability of the inorganic polymeric complex to store energy is based upon the presence of the free electrons present in the complex.

A further interesting, valuable utility of various inorganic polymeric complexes produced in accordance with the method of the present invention is in the production of synthetic gem stones. In this respect, since the inorganic polymeric complexes contain an alkali metal such as sodium or potassium, and one or more non-alkaline metals, it is possible to provide an inorganic polymeric complex in which the metal components match those of gem stones. When such inorganic polymeric complex is subjected to degassing by heating at elevated temperature, a crystalline solid product results, which product closely resembles in structure and characteristics the desired gem stone.

Generally, in order to match the alkali metal content of the gem stone, the inorganic polymeric complex of the present invention must be produced in such way as to have a reduced alkali metal content. Sometimes, the inorganic polymeric complex may contain no more than up to about 10% of the alkali metal, based on the total metal content of the complex. Such as inorganic polymeric complex can be prepared by one of the two possible techniques, either a dilution/reaction method or straight reaction method. In the dilution/reaction method, an inorganic polymeric complex is produced in substantially the same manner as has been described, the polymeric complex thereafter being diluted with aqueous ammonia or water, and subsequently, further reacted with additional non-alkaline metal. This further reaction with additional non-alkaline metal is carried out until the desired ratio between the alkali metal and non-alkaline metal is achieved.

In the straight reaction method, the inorganic polymeric complex is prepared utilizing the total amount of the desired alkali metal in the reaction's initial phase. However, due to the small amount of alkali metal utilized, the endothermic phase of the reaction will be slight, with the rate of the reaction again being proportional to the surface area of the non-alkaline metal. With only a small amount of alakli metal present, care must be taken to avoid excessive erosion of the non-alkaline metal which could result in salt formation, rather than production of the desired inorganic polymeric complex. Further dilution of the inorganic polymeric complex and/or heating to develop an exothermic phase can eliminate this salt formation.

The inorganic polymeric complexes of the present invention have the interesting capability of acting as a solvent for oxides and hydroxides of non-alkaline metals. Many unique applications of this inorganic polymeric complex result from this ability.

A principal use of the inorganic complexes of the present invention is in plating the non-alkaline metal from solutions of the inorganic polymeric complex. The inorganic polymeric complex can be utilized as a plating solution directly as it is produced from the exothermic phase of the reaction or, if too viscous, can be diluted with water. It has been determined in accordance with the present invention that plating can be achieved by utilization of any of the inorganic polymeric complexes of the present invention. However, certain plating variables must be altered for specific plating operations, including the parameters of voltage, amperage, temperature and/or type of electrode utilized.

A very unique characteristic of the inorganic polymeric complexes with respect to plating is that through the use of these complexes it is possible to plate certain metals which have not been previously capable of plating. Reference is made, for example, to the refractory metals such as titanium, tantalum and niobium, as well as to silicon. While silicon has been previously reported as being deposited by vacuum deposition and sputtering techniques, there appears to be no record of the successful plating of silicon metal.

Still further, it has been determined that platings of 99% purity and higher have been achieved through the use of the inorganic polymeric complexes of the present invention. Moreover, it has been discovered in accordance with the present invention that alloy plating can be achieved by utilizing an inorganic polymeric complex which contains more than one non-alkaline metal, or by mixing two or more inorganic polymeric complexes of the present invention. Still further, by using a carbon electrode, metal carbide plating has been found to be achievable. All of these applications of the inorganic polymeric complex of the present invention establish the unusual utility of these materials.

The present invention will now be described in reference to the following specific examples. Such examples are presented for purposes of illustration only, and shall not under any circumstances be deemed as limiting the present invention. In these examples, unless otherwise indicated, all percentages are by weight.

EXAMPLE 1

Three duplicate runs were carried out in accordance with the present invention in order to study the reproducability of the inorganic polymeric complex. These runs were as follows:
1. Low purity silicon/potassium hydroxide
2. High purity silicon/potassium hydroxide
3. High purity silicon/sodium hydroxide In studying the reproducibility of the inorganic polymeric complex, the amounts of reactants were kept constant for the duplicate runs. In addition, the parameters of surface area of the silicon, rate of addition of the alkali metal hydroxide and length of time of the exothermic reaction were kept as constant as possible.

Low Purity Silicon/Potassium

In this duplicate study, a mole ratio of silicon to potassium of 2:1 was employed in the initial reactants. The reactants involved 616 grams of silicon metal, 616 grams of potassium hydroxide and 1,998.3 grams of ammonium hydroxide, based upon a 26 Be solution of ammonium hydroxide in water. The silicon metal had an average particle size of ½ inch to ¾ inch. The potassium hydroxide was added to reaction vessel containing the aqueous ammonia and silicon metal. The potassium hydroxide was added in small increments, the addition being completed in approximately two hours. An endothermic phase was developed which lasted approximately 6 hours. Thereupon, an exothermic phase developed which was completed in approximately 45 minutes. First and second reactions were carried out on consecutive days with the following results:

|  | Reaction No. 1 | Reaction No. 2 |
|---|---|---|
| Silicon | 7.93% | 7.86% |
| Potassium | 8.72% | 8.68% |
| Weight % Ratio | 1.0996 | 1.1056 |
| Si:K Ratio | 1.2659 | 1.2591 |

It is noted that the results achieved in reaction No. 1 and reaction No. 2 are quite comparable, indicating that the inorganic polymeric complex can be reproduced, when the conditions are controlled. It should be noted that the endothermic and exothermic phase in this reaction were shortened by the use of low purity silicon, even though potassium was employed as the alkali metal. The impurities present in the silicon, principally iron, tend to increase the reactivity of the silicon metal, thereby shortening both the endothermic phase and exothermic phase of the reaction.

High Purity Silicon/Potassium

In this duplicates study, the same amounts of reactants were utilized with the exception that 2,054.8 grams of aqueous ammonia were utilized and the silicon metal had an average particle size of 1 inch to 1½ inches. In these duplicate runs the potassium hydroxide addition was completed in approximately 3 hours. The endothermic phase of the reaction lasted approximately 8 hours while the exothermic phase was completed in approximately 80 minutes. Again, duplicate reactions produced the following results:

|  | Reaction No. 1 | Reaction No. 2 |
|---|---|---|
| Silicon | 4.92% | 4.93% |
| Potassium | 12.19% | 11.93% |
| Weight % Ratio | 2.4776 | 2.4199 |
| Si:K Ratio | 0.5619 | 0.5752 |

Here again, it can be noted from reactions No. 1 and No. 2 that excellent reproducability of the inorganic polymeric complex is achieved. The lower amount of silicon in the inorganic polymeric complex, is due to the lower reactivity of the high purity silicon when compared with the low purity silicon. While potassium hydroxide was utilized as the alkali metal hydroxide, the endothermic phase and exothermic phase were not as drawn out as in the model system of FIG. 1, principally due to the manner of introduction of the potassium hydroxide, i.e., a shorter period of introduction when compared to typical potassium hydroxide introduction. In addition, the particle size and surface area of the high purity silicon appeared to affect the reaction dynamics.

High Purity Silicon/Sodium

The reaction, parameters utilized in connection with these duplicate runs were the same as observed in connection with the high purity silicon/potassium reaction above. The results achieved were:

|  | Reaction No. 1 | Reaction No. 2 |
|---|---|---|
| Silicon | 6.89% | 6.87% |
| Sodium | 6.77% | 6.77% |
| Weight % Ratio | 0.9826 | 0.9854 |
| Si:Na Ratio | 0.8329 | 0.8306 |

It can be observed from the above results that here again with the use of sodium hydroxide, excellent reproducability of the inorganic polymeric complex was achieved. In each of the above duplicate runs, analysis of the silicon content of the inorganic polymeric complex was achieved by determining the $SiO_2$ present after double dehydration and emulsion of the $SiO_2$ with hydrofluoric acid. The sodium and potassium determinations were obtained directly by atomic absorption using flame photometry.

EXAMPLE 2

Further experiments were carried out utilizing low and high purity silicon with sodium hydroxide or potassium hydroxide in order to study the effect of parameters on the ratio of the alkali metal to the non-alkaline metal in the reaction. The parameters studied were a surface area of the non-alkaline metal and the duration of the exothermic phase of the reaction. Since it is difficult to measure surface area of any nonhomogeneous metal, the surface area was established by relating it to screen and mesh size.

In each of the following experiments, the addition of the alkali metal hydroxide to the reaction medium of aqueous ammonia and either low purity silicon or high purity silicon metal was achieved in 2 to 3 hours. In each of the experiments, a natural endothermic phase was developed which gave way to a natural exothermic phase after approximately 6 to 18 hours. In each of the experiments, the exothermic phase of the reaction was approximately 1–2 hours, with the reaction being terminated after the exothermic phase of removal of unreacted silicon metal. The analysis of the inorganic polymeric complexes formed was carried out in the same manner as set forth above with regard to example 1. The following experimental results were achieved:

```
Experiment A
Low purity silicon
Mol ratio                          2 Si:1 K
KOH                                616 gr.
NH₄OH*                             1,998.3 gr.
Si                                 616 gr.
Metal size                         ½" to ¾"
    Si   7.93%
    K    8.72%
    Ratio Si:K in polymer   1.2659
Experiment B
Low purity silicon
Mol ratio                          2 Si:1 K
KOH                                616 gr.
NH₄OH                              1,995.7 gr.
Si                                 616 gr.
Metal size                         ½" to ¾"
    Si   7.86%
    K    8.68%
    Ratio Si:K in polymer   1.2591
Experiment C
Low purity silicon
Mol ratio                          4 Si:1 K
KOH                                308 gr.
NH₄OH                              1,995.0 gr.
Si                                 616 gr.
Metal size                         1" to 1½"
    Si   7.15%
    K   10.63%
    Ratio Ki:K in polymer   0.9364
Experiment D
Low purity silicon
Mol ratio                          1.3 Si:1 K
KOH                                924 gr.
NH₄OH                              1,996.2 gr.
Si                                 616 gr.
Metal size                         ¼" to ½"
    Si   6.67%
    K   10.43%
    Ratio Si:K in polymer   0.8902
Experiment E
High purity silicon
Mol ratio                          2 Si:1 K
KOH                                616 gr.
NH₄OH                              2,054.9 gr.
Si                                 616 gr.
Metal size                         1" to 1½"
    Si   4.92%
    K   12.19%
    Ratio Si:K in polymer   0.5619
Experiment F
High purity silicon
Mol ratio                          2 Si:1 K
KOH                                616 gr.
NH₄OH                              2,054.8 gr.
Si                                 616 gr.
Metal size                         1" to 1½"
    Si   4.93%
    K   11.93%
    Ratio Si:K in polymer   0.5752
Experiment G
Low purity silicon
Mol ratio                          1.3 Si:1 K
KOH                                924 gr.
NH₄OH                              2,043.0 gr.
Si                                 616 gr.
Metal size                         ¾" to 1"
```

-continued
```
    Si   4.15%
    K   13.42%
    Ratio Si:K in polymer   0.4307
Experiment H
High purity silicon
Mol ratio                          3 Si:1 K
KOH                                616 gr.
NH₄OH                              2,043.0 gr.
Si                                 924 gr.
Metal size                         ½" to ¾"
    Si   6.83%
    K    9.62%
    Ratio Si:K in polymer   0.9886
Experiment I
High purity silicon
Mol ratio                          6 Si:1 K
KOH                                616 gr.
NH₄OH                              1,816.0 gr.
Si                                 1,815.0 gr.
Metal size                         ¾" to 1"
    Si   7.14%
    K    9.70%
    Ratio Si:K in polymer   1.0246
Experiment J
Low purity silicon
Mol ratio                          2 Si:1 K
KOH                                616 gr.
NH₄OH                              1,986.2 gr.
Si                                 616 gr.
Metal size                         ¾" to 1"
    Si   5.60%
    K   11.62%
    Ratio Si:K in polymer   0.6709
Experiment K
High purity silicon
Mol ratio                          5.6 Si:1 K
KOH                                616 gr.
NH₄OH                              1,991.3 gr.
Si                                 1,730.95 gr.
Metal size                         ½" to 1"
    Si   8.17%; 8.22%
    K    8.32%; 8.61%
    Ratio Si:K in polymer   1.3670; 1.3292
                            (duplicate analyses)
Experiment L
Low purity silicon
Mol Ratio                          2 Si:1 Na
NaOH                               440 gr.
NH₄OH                              2,050.4 gr.
Si                                 616 gr.
Metal size                         ½" to ¾"
    Si   7.67%
    Na   5.93%
    Ratio Si:Na in polymer  1.0769
Experiment M
High purity silicon
Mol ratio                          6 Si:1 Na
NaOH                               440 gr.
NH₄OH                              2,053.6 gr.
Si                                 1,816.0 gr.
Metal size                         ¾" to 1"
    Si   6.89%
    Na   6.77%
    Ratio Si:Na in polymer  0.8329
Experiment N
High purity silicon
Mol ratio                          6 Si:1 Na
NaOH                               440 gr.
NH₄OH                              2,055.0 gr.
Si                                 1,816.0 gr.
Metal size                         ¾" to 1"
    Si   6.87%
    Na   6.77%
    Ratio Si:Na in polymer  0.8306
Experiment O
High purity silicon
Mol ratio                          6.5 Si:1 Na
NaOH                               440 gr.
NH₄OH                              2,043.0 gr.
Si                                 2,014.7 gr.
Metal size                         1" to 1½"
    Si   6.16%
    Na   8.70%
    Ratio Si:Na in polymer  0.5795
```

*26 Bé in all runs

It is observed from the above experimental results that the amount of the non-alkaline metal that reacts with the alkaline metal in the preparation of the inorganic polymeric complex is directly proportional to the surface area of the non-alkaline metal.

A molecular weight determination was curved out with respect to the product of Example M. The determination was by membrane osmometry in 0.1 M NaOH at 45° C. A polymer concentration of 21.67% in the aqueous medium was found with a $\overline{M}_n$ of 36,900, yielding a molecular weight of about 160,000.

EXAMPLE 3

Following the procedure essentially as recited in Example 1, a zinc/potassium inorganic polymeric complex was prepared by reacting 390 grams of zinc metal, 168 grams of potassium hydroxide and 315 grams of aqueous ammonia (26 Bé). The molor ratio of zinc to potassium in the reactant system was 2:1.

Figure 11:
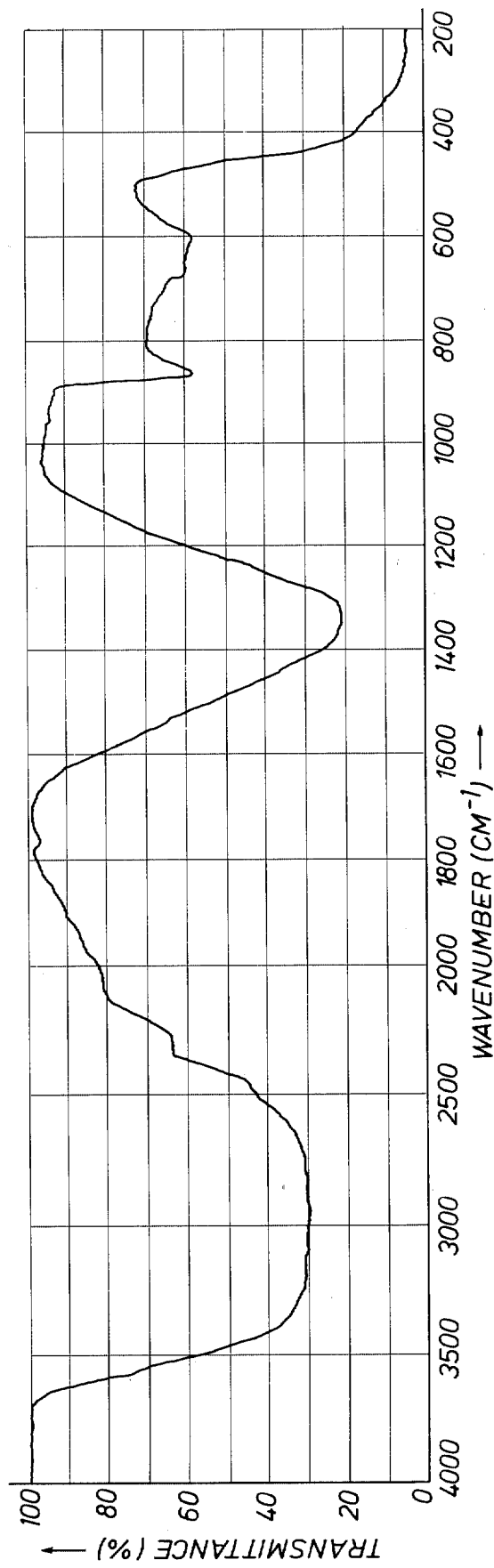
FIG. 11 is an infra-red scan of a Zn-K system.

After the exothermic phase of the reaction, the inorganic polymeric complex was analyzed to contain 4.78% zinc and 24.93% potassium. Both the zinc content and potassium content of the polymer were determined by direct atomic absorption. FIG. 11 represents the infra-red scan for this zinc/potassium inorganic polymeric complex.

EXAMPLE 4

Following the same procedure as Example 3, an inorganic polymeric complex of tantalum and sodium was produced by adding 40 grams of sodium hydroxide to a reaction medium comprising 210 grams of aqueous ammonia (26 Bé) and 908 grams of tantalum metal, the initial molar ratio of tantalum to sodium in the reaction system being 5:1. The inorganic polymeric complex, after the exothermic phase of the reaction, was analyzed to contain 6.49% tantalum and 6.87% sodium. The analysis of the tantalum was achieved by precipitation by cupferron and the sodium analysis was carried out by atomic absorption.

FIG. 12 represents the infra-red scan for this tantalum/sodium inorganic polymeric complex.

EXAMPLE 5

Following the procedure of Example 3, a tin/sodium inorganic polymeric complex was prepared by reacting 80 grams of sodium hydroxide with 1,190 grams of tin metal in 300 grams of aqueous ammonia (26 Bé), the initial reaction ratio of tin to sodium being 5:1. Again, the introduction of the sodium hydroxide was carried out to first develop an endothermic phase of reaction and thereafter, an exothermic phase. Analysis of the inorganic polymeric complex obtained after the exothermic phase of the reaction yielded 13.44% sodium and 0.32% tin. The tin analysis was done by reduction with nickel and titration with $KIO_3$. The sodium analysis was done by atomic absorption.

FIG. 13 represents an infra-red scan of this tin/sodium inorganic polymeric complex.

EXAMPLE 6

Following the same procedure as Example 3, a beryllium/potassium polymer was obtained by reacting 140 grams of potassium hydroxide with 45 grams of beryllium metal in 265.5 grams of aqueous ammonia (26 Bé). The reaction was carried through a first endothermic phase, and thereafter, through an exothermic phase of reaction. The inorganic polymeric resulting from the exothermic phase of the reaction was analyzed to contain 0.21% beryllium and 22.64% potassium. The beryllium analysis was carried out by precipitation of the phosphate and correction to the beryllium metal. Potassium analysis was done by atomic absorption.

FIG. 14 represents the infra-red scan of this beryllium/potassium inorganic polymeric complex.

EXAMPLE 7

Following the procedure of Example 3, an inorganic polymeric complex of zirconium and sodium was prepared. The reactants were: zirconium metal, 2,184 grams; sodium hydroxide, 120 grams; aqueous ammonia, 525 grams (26 Bé). The initial molar ratio of zirconium to sodium was 8:1. The inorganic polymeric complex resulting from the exothermic phase of the reaction was analyzed. The zirconium was precipitated as zirconium oxide in cupferron and the sodium content was determined by atomic absorption. This analysis yielded 2.73% zirconium and 8.46% sodium.

FIG. 15 represents the infra-red scan for this zirconium/sodium inorganic polymeric complex.

EXAMPLE 8

Again following the same procedure as in Example 3, a niobium/potassium inorganic polymeric complex was prepared. The reactants were: 186 grams of niobium metal, 56 grams of potassium hydroxide and 210 grams of aqueous ammonia (26 Bé). The initial molar ratio of niobium to potassium was 2:1. The inorganic polymeric complex resulting after the exothermic phase of the reaction was analyzed to determine the niobium and potassium content. The niobium content was achieved by precipitation as niobium oxide $Nb_2O_5$ by cupferron. The potassium was analyzed by atomic absorption. The results yielded 3.19% niobium AND 12.07% potassium.

FIG. 16 represents the infra-red scan of the niobium/potassium inorganic polymeric complex.

EXAMPLE 9

Utilizing the same procedure as above, a molybdenum/sodium inorganic polymeric complex was prepared by reacting 40 grams of sodium hydroxide with 384 grams of molybdenum metal in a reaction medium comprising 245 grams of aqueous ammonia (26 Bé), the addition of the sodium hydroxide being such as to develop an endothermic phase of the reaction and thereafter, an exothermic phase of reaction. The initial molar ratio of molybdenum to sodium was 4:1.

The inorganic polymeric complex resulting from the exothermic reaction was analyzed to determine the molybdenum and sodium content. The molybdenum was precipitated by benzo-oxime and analyzed. The sodium was determined by direct atomic absorption. As a result, it was found that the inorganic polymeric complex contained 1.06% molybdenum and 8.10% sodium.

FIG. 17 represents the infra-red scan for this molybdenum/sodium inorganic polymeric complex.

EXAMPLE 10

An aluminum/sodium inorganic polymeric complex was prepared utilizing a procedure the same as that discussed above with respect to Example 3. In this example, 520 grams of sodium hydroxide were reacted with 702 grams of aluminum metal in 1,820 grams of aqueous ammonia (26 Bé). Again, the addition of the sodium hydroxide was such as to first develop an endothermic phase of reaction and thereafter, an exothermic phase. The initial molar ratio of aluminum to sodium in the reactants was 2:1.

The inorganic polymeric complex resulting from the exothermic phase of the reaction was analyzed. The aluminum content of the complex was determined by hydroxide separation and ignition as aluminum oxide. The sodium content was determined by atomic absorption. An aluminum content of 18.31% was found and a sodium content of 11.25% was found.

Figure 18:
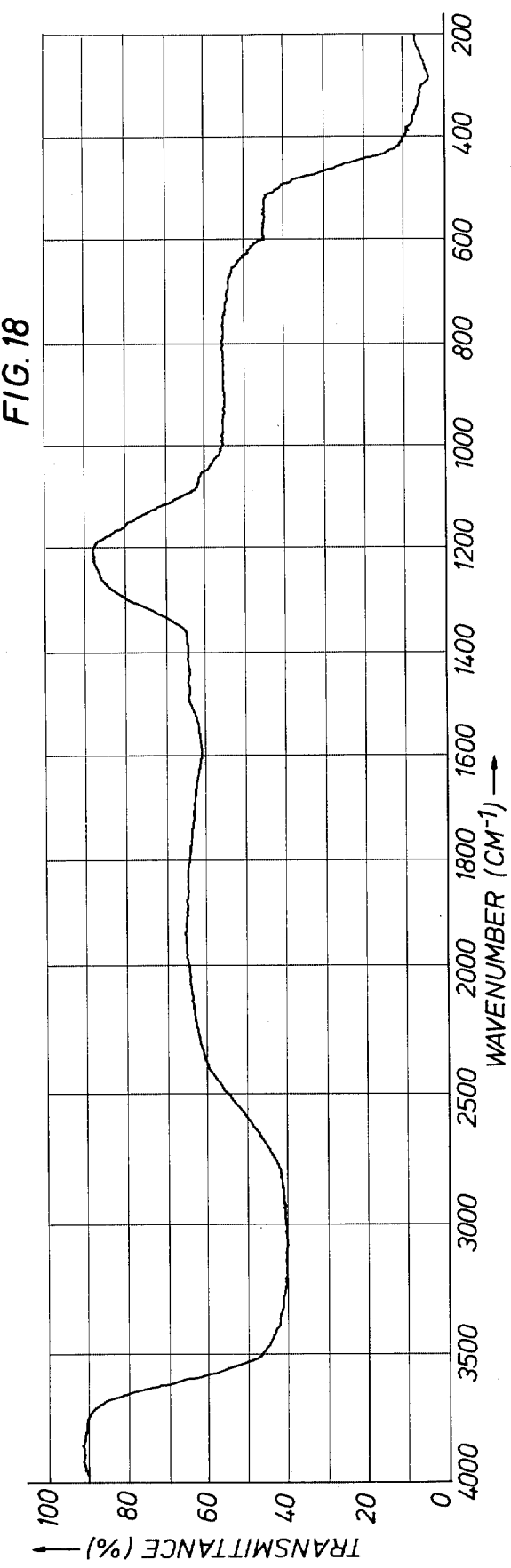
FIG. 18 is an infra-red scan of a Al-Na system.

FIG. 18 represents the infra-red scan for this aluminum/sodium inorganic polymeric complex.

EXAMPLE 11

Utilizing the same procedure as set forth above with respect to Example 3, an iron/sodium inorganic polymeric complex was prepared. The reactants were: 224 grams of iron, 160 grams of sodium hydroxide and 560 grams of aqueous ammonia (26 Bé). The initial molar ratio of iron to sodium was 1:1. Again, the introduction of the sodium hydroxide was such as to first develop an endothermic phase of reaction and thereafter, an exothermic phase of reaction. The inorganic polymeric complex resulted from this exothermic phase of reaction.

To determine the iron and sodium content of this inorganic polymeric complex, the iron was titrated with potassium permanganate and the sodium was determined directly by atomic absorption. An iron content of 0.94% and a sodium content of 23.00% were found.

Figure 19:
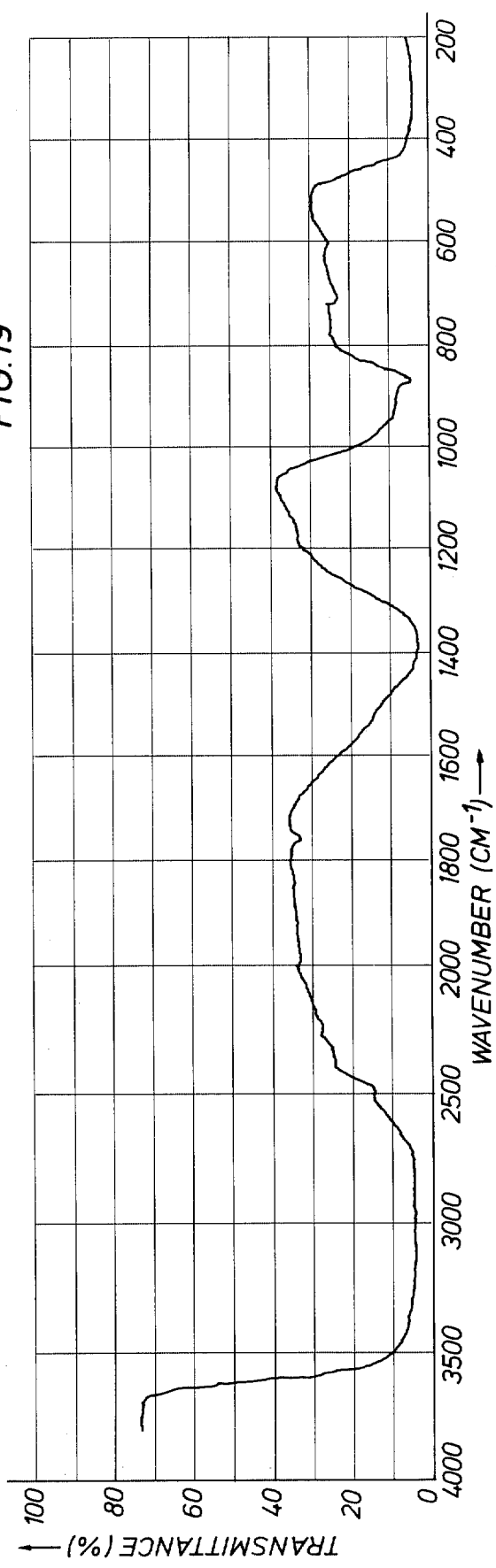
FIG. 19 is an infra-red scan of a Fe-Na system.

FIG. 19 represents the infra-red scan for this iron/sodium inorganic polymeric complex.

EXAMPLE 12

A procedure similar to that set forth above in Example 3 was carried out in order to produce a bismuth/sodium inorganic polymeric complex. In this example, the following reactants were utilized: bismuth, 627 grams; sodium hydroxide, 40 grams; aqueous ammonia, 210 grams (26 Bé). The initial molar ratio of bismuth to sodium in the reactants was 3:1.

Again, the sodium hydroxide was added to the reaction medium containing the bismuth metal and aqueous ammonia in order to first produce an endothermic phase and thereafter, an exothermic phase. The reaction was terminated by withdrawing excess bismuth metal after the exothermic phase of the reaction. The inorganic polymeric complex of bismuth and sodium resulting from this exothermic phase of the reaction was analyzed to determine the bismuth and sodium content. The bismuth content was determined by hydroxide separation, while the sodium content was obtained by atomic absorption. A bismuth content of 0.29% was determined, and a sodium content of 8.25% was determined.

Figure 20:
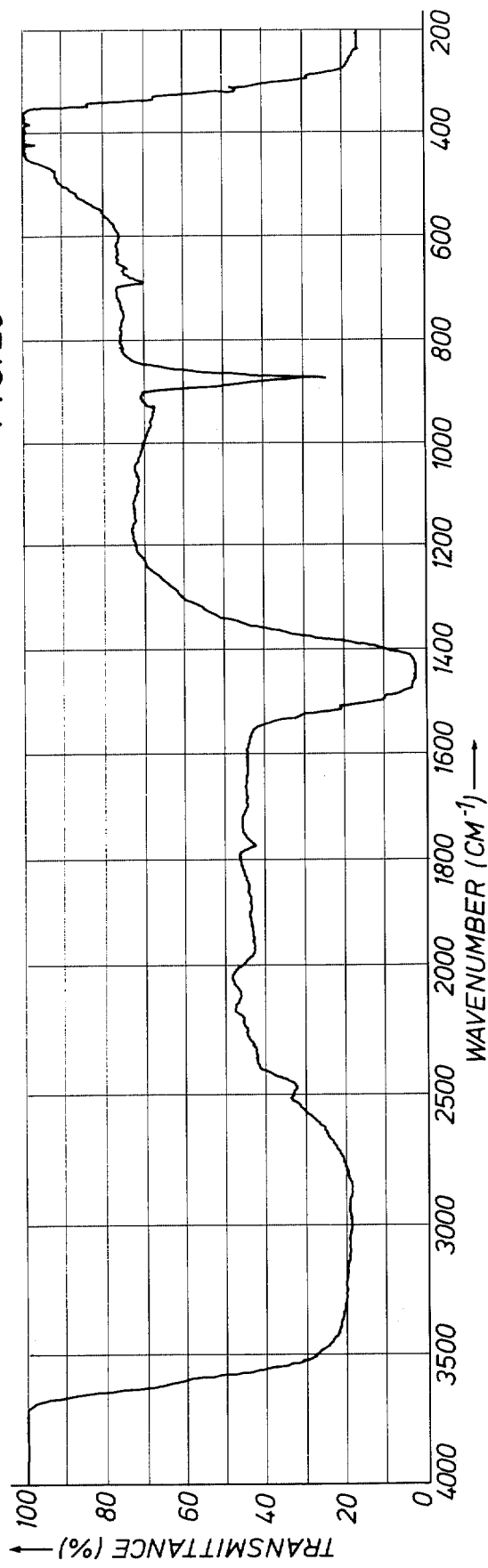
FIG. 20 is an infra-red scan of a Bi-Na system.

FIG. 20 represents the infra-red scan of this bismuth/sodium inorganic polymeric complex.

EXAMPLE 13

An inorganic polymeric complex of indium and potassium was prepared utilizing a procedure similar to that of Example 3. In this example, 112 grams of potassium hydroxide were introduced into a reaction vessel containing 690 grams of indium metal and 280 grams of aqueous ammonia (26 Bé), the initial molar ratio of indium to postassium being 3:1. Again, the introduction of the potassium hydroxide was such as to develop an endothermic phase of reaction and thereafter, an exothermic phase of reaction. The inorganic polymeric complex of indium and potassium resulted from this exothermic phase.

The indium content of the complex was analyzed by hydroxide precipitation from a perchloric acid medium. The potassium content was analyzed by atomic absorption. An indium content of 1.94% was found and a potassium content of 25.46% was found.

Figure 21:
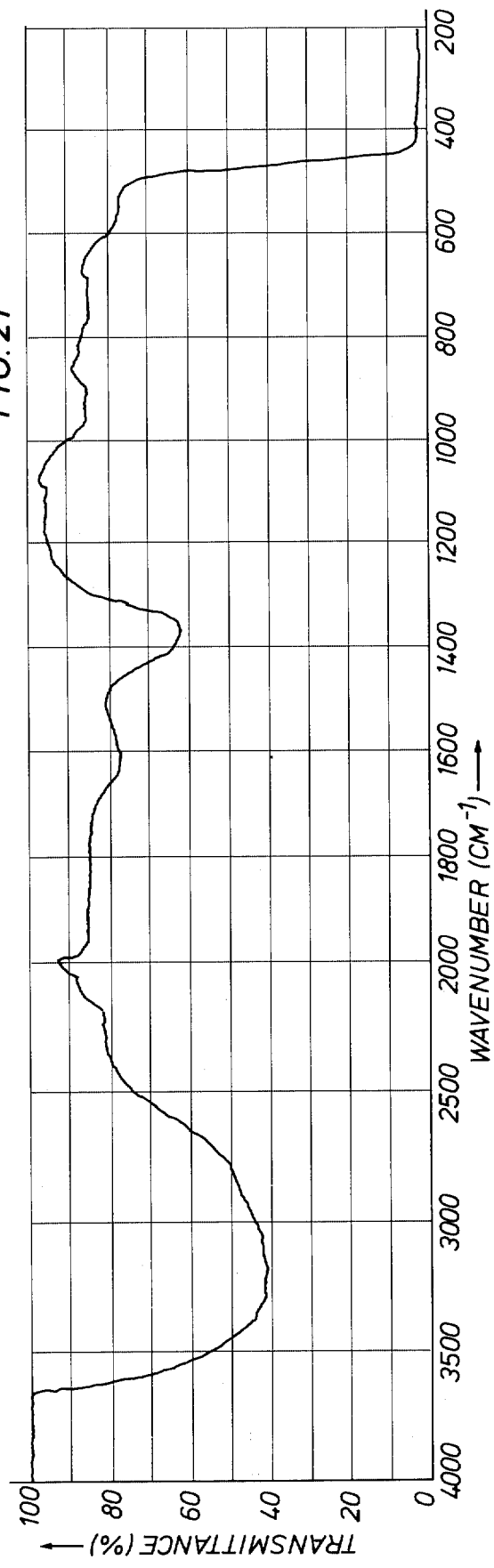
FIG. 21 is an infra-red scan of an In-K system.

FIG. 21 represents the infra-red scan of this indium/potassium inorganic polymeric complex.

EXAMPLE 14

Following the same procedure as above, a titanium/sodium inorganic complex was obtained by reacting the following: 1,968 grams of titanium metal, 328 grams of sodium hydroxide, and 1,435 grams of aqueous ammonia (26 Bé). The initial molar ratio of titanium to sodium was about 5:1. Again, the introduction of the sodium hydroxide into the reaction medium containing the titanium metal and aqueous ammonia was such as to produce an intitial endothermic phase of reaction and subsequently, an exothermic phase of reaction.

The inorganic polymeric complex resulting from the exothermic phase of the reaction was analyzed to contain 11.54% sodium and 3.81% titanium. The titanium analysis was carried out by precipitation of titanium dioxide by cupferron. The sodium analysis was carried out by atomic absorption.

FIG. 22 represents the infra-red scan of the titanium/sodium inorganic polymeric complex.

EXAMPLE 15

Following the same procedure as indicated above in Example 3, a cobalt/sodium inorganic polymeric complex was prepared for the following reactants: 2,183 grams of cobalt metal, 296 grams of sodium hydroxide, 1036 grams of aqueous ammonia (26 Bé). The initial molar ratio of cobalt to sodium was 5:1. Again, the introduction of the sodium hydroxide into the reaction medium containing the cobalt metal and aqueous ammonia effectively achieved the production of an endothermic phase of reaction and thereafter, an exothermic phase of reaction.

The inorganic polymeric complex of cobalt and sodium resulting from the exothermic phase of reaction was anaylzed to determine the cobalt and sodium contents. Both analyses were done by atomic absorption. It was found that the inorganic polymeric complex contained 0.15% cobalt and 16.23% sodium.

FIG. 23 represents the infra-red scan of this cobalt/sodium inorganic polymeric complex.

EXAMPLE 16

Two different chromium/sodium inorganic polymeric complexes were prepared by the procedure of Example 3. These reactions differed principally in the amount of chronium introduced into the inorganic polymeric complex. In the first reaction, 260 grams of chromium metal were reacted with 40 grams of sodium hydroxide in 245 grams of aqueous ammonia (26 Bé). In the second reaction, 260 grams of chromium were reacted with 56 grams of sodium hydroxide in 245 grams of aqueous ammonia (26 Be). In the first case, the initial molar ratio of chromium to sodium 5:1. In the second case, the initial molar ratio of chromium to sodium was 5:1.

Each reaction was carried out in a similar manner, first forming an endothermic phase and thereafter, an exothermic phase of reaction. Excess chromium was removed from the system after the exothermic phase of reaction and both of the inorganic polymeric complexes resulting from this exothermic phase of reaction were analyzed. Both the chromium determination and sodium determination were carried out by atomic absorption. The product of the first reaction was found to contain 1.19% chromium and 6.18% sodium. The product of the second reaction was found to contain 3.93% chromium and 15.60% sodium.

EXAMPLE 17

Following a similar procedure as above a tungsten/sodium polymer was prepared from the following reactants: tungsten metal, 552 grams; sodium hydroxide, 40 grams; aqueous ammonia, 245 grams (26 Bé). The initial molar ratio of tungsten to sodium in the reaction was 3:1. Again, the introduction of the sodium hydroxide was carried out to produce a first endothermic phase and thereafter, an exothermic phase.

The inorganic polymer complex resulting from the exothermic phase was analyzed to determine the tungsten and sodium content. The tungsten content was analyzed by precipitation with cinconine and ignition as tungstic oxide, $WO_3$. The sodium content was determined by atomic absorption. It was found that this inorganic polymeric complex contained 2.38% tungsten and 9.57% sodium.

EXAMPLE 18

A manganese/sodium polymer was prepared in a manner similar to the above, utilizing 3,135 grams of manganese, 285 grams of sodium hydroxide, and 1,995 grams of aqueous ammonia (26 Bé). the molar ratio of manganese to sodium in the reaction being 8:1. A similar endothermic phase and exothermic phase were developed.

The product resulting from the exothermic phase of the reaction, i.e., the inorganic polymeric complex, was analyzed to determine the manganese and sodium content. A manganese content of 1.79% and a sodium content of 11.05% were found. The manganese content was determined by direct titration and the sodium content was determined by atomic absorption.

EXAMPLE 19

Following a similar procedure to that set forth above, a nickel/sodium inorganic polymeric complex and a nickel/potassium inorganic polymeric complex were produced. In producing the nickel/sodium inorganic polymeric complex, 2,242 grams of nickel were reacted with 380 grams of sodium hydroxide, and 1,330 grams of aqueous ammonia (26 Bé). In producing the nickel/potassium inorganic polymeric complex the 380 grams of sodium hydroxide were replaced with 532 grams of potassium hydroxide. In each case, the initial molar ratio of nickel to alkali metal was about 4:1.

Each reaction was carried out through the addition of the alkali metal hydroxide to produce an endothermic phase of reaction and thereafter, an exothermic phase of reaction.

The inorganic polymeric complex resulting from the exothermic phase of the reaction was analyzed in the case of each of the complexes prepared. The nickel, potassium and sodium were all analyzed by direct determination by atomic absorption. In the case of the nickel/sodium inorganic polymeric complex, the analysis yielded 0.15% nickel and 14.86% sodium. In the case of the nickel/potassium inorganic polymeric complex, the analysis yielded 0.19% nickel and 23.55% potassium.

EXAMPLE 20

Utilizing a similar procedure to that of Example 3, a silver/sodium inorganic polymeric complex was prepared by reacting 216 grams of silver metal with 40 grams of sodium hydroxide in 70 grams of aqueous ammonia (26 Bé). The initial molar ratio of the reactants was 2:1. Again, an endothermic phase of reaction and subsequent exothermic phase of reaction were developed by the addition of the sodium hydroxide to the reaction medium containing the silver metal and aqueous ammonia.

The inorganic polymeric complex resulting from the exothermic phase of the reaction was found to contain 0.21% silver and 16.51% sodium, both by atomic absorption. It was also found in accordance with the present invention that when utilizing silver in a powder form it is often necessary to increase the aqueous ammonia content, such as by a factor of 2 due to the fact that the silver powder tends to become sponge-like and readily absorbs the aqueous ammonia. This generally tends to produce a proportional decrease in the amount of the alkali metal in the inorganic polymeric product.

EXAMPLE 21

A cadmium/sodium inorganic polymeric complex was obtained by reacting 1,120 grams of cadmium with 200 grams of sodium hydroxide and 525 grams of aqueous ammonia (26 Bé). The initial molar ratio of cadmium to sodium in the reactants was 2:1.

The cadmium content and sodium content of the inorganic polymeric complex resulting from the exothermic phase of the reaction were analyzed by atomic absorption. A cadmium content of 0.37% was found, as was a sodium content of 18.04%.

EXAMPLE 22

This example illustrates the preparation of a gallium/sodium polymer utilizing a similar reaction procedure as described above. In this example, 700 grams of gallium were reacted with 80 grams of sodium in 280 grams of aqueous ammonia (26 Bé). the sodium hydroxide being added to the reaction vessel containing the gallium metal and aqueous ammonia so as to initiate an endothermic phase of reaction and thereafter, an exothermic phase of reaction. The initial molar ratio of gallium to sodium was 5:1.

The inorganic polymeric complex resulting from the exothermic phase of the reaction was analyzed to determine the gallium and sodium content. Both gallium and sodium were analyzed by direct atomic absorption. This analysis yielded 0.33% gallium and 9.32% sodium.

EXAMPLE 23

A similar procedure was utilized to produce an inorganic polymer from antimony and sodium by reacting 366 grams of antimony metal with 40 grams of sodium hydroxide and 210 grams of aqueous ammonia (26 Bé). The initial molar ratio of antimony to sodium was 3:1.

The inorganic polymeric complex resulting from the exothermic phase of the reaction was analyzed to determine the antimony and sodium content. Both analyses were done by atomic absorption. The inorganic polymeric complex analyzed as 0.49% antimony and 10.39% sodium.

EXAMPLE 24

A tellurium/sodium polymer was prepared in the same manner as above by reacting 128 grams of tellurium with 40 grams of sodium hydroxide in 245 grams of aqueous ammonia (26 Be). The initial molar ratio of tellurium to sodium in the reaction system was 2.5:1. Again, the addition of the sodium hydroxide was such as to develop an initial endothermic phase of reaction and thereafter, an exothermic phase of reaction.

The inorganic polymeric complex resulted from the exothermic phase of reaction. This inorganic polymeric complex was analyzed to determine the tellurium and sodium content. The tellurium was precipitated by reduction with $SO_2$ to the tellurium metal. The sodium content was determined from the filtrate of the precipitation by atomic absorption. The results of this analysis were 0.81% tellurium and 30.06% sodium.

EXAMPLE 25

Two copper/sodium inorganic polymeric complexes were prepared utilizing copper metal and sodium hydroxide. Two reactions were carried out, varying the copper content in the inorganic polymeric complex. In the first reaction, 450 grams of copper were reacted with 100 grams of sodium hydroxide in 800 ml of aqueous ammonia (26 Be).

In the second reaction, 450 grams of copper were reacted with 200 grams of sodium hydroxide in 800 ml of aqueous ammonia (26 Be).

In both cases, the addition of the sodium hydroxide was such as to develop an endothermic phase of reaction and thereafter, an exothermic phase of reaction. The inorganic polymeric complexes resulting from the exothermic phases of the reactions were analyzed for copper content and sodium content, both by atomic absorption. In the case of the first reaction, a copper content of 0.23% and a sodium content of 7.63% was found. In the case of the second reaction, a copper content of 0.07% and a sodium content of 14.94% were found.

EXAMPLE 26

A magnesium/sodium inorganic polymeric complex was prepared by reacting 600 grams of magnesium metal, 200 grams of sodium hydroxide and 525 grams of aqueous ammonia (26 Be). in accordance with the procedure described above.

EXAMPLE 27

A gold/sodium inorganic polymeric complex was prepared by reacting 394 grams of gold metal, 40 grams of sodium hydroxide and 140 grams of aqueous ammonia (26 Be). in accordance with the process as described in Example 3.

EXAMPLE 28

A titanium/potassium inorganic polymeric complex was prepared utilizing ammonia gas to supplement the aqueous ammonia. The reaction involved 1,968 grams of titanium and 459.2 grams of potassium hydroxide. The desired amount of aqueous ammonia was 1,435 grams, about 26 B aqueous ammonia. To achieve this, some 915.9 grams of ammonia gas were introduced continuously into the reaction vessel. The ammonia gas was introduced from beneath the titanium metal to provide a uniform dispersion of ammonia gas and contact between the gas and titanium. An aqueous medium was employed. A dry-ice condenser was also employed for reflux purposes to prevent the escape of the ammonia gas, keeping as much ammonia as possible in the reaction system.

As a result of this reaction, a similar endothermic phase and exothermic phase was achieved through the metering of the potassium hydroxide into the reaction system. The inorganic polymeric complex prepared through this procedure appears similar to those complexes obtained by the use of aqueous ammonia.

EXAMPLE 29

A tantalum/potassium inorganic polymeric complex was prepared utilizing 908 grams of tantalum metal, 56 grams of potassium hydroxide and 210 grams of aqueous ammonia (26 Be). The initial molar ratio of tantalum to potassium was 5:1.

The tantalum metal was introduced into the reaction vessel with the aqueous ammonia and the potassium hydroxide was added slowly to generate the endothermic phase and exothermic phase of the reaction. Due to the tendency for tantalum to polarize hydrogen, a power supply was added to the system, utilizing a tantalum anode and tantalum cathode in contact with the tantalum metal in the reaction vessel. As a result of this, a small current was passed through the tantalum metal. This had the effect of depolarizing the surface of the tantalum metal, thereby assuring the development of the desired endothermic phase and subsequent exothermic phase of the reaction. As a result of this procedure, an inorganic polymeric complex of tantalum and sodium was prepared.

EXAMPLE 30

An indium/potassium inorganic polymeric complex was prepared by reacting 690 grams of indium, 122 grams of potassium hydroxide and 280 grams of aqueous ammonia (26 Be). In this process, a hot water bath was utilized to initiate the exothermic phase of the reaction. The inorganic polymeric complex of indium and potassium resulted.

EXAMPLE 31

This example represents the preparation of an inorganic polymeric complex for gem stone preparation. This example is carried out to provide a minimum of sodium in the silicon/sodium inorganic polymeric complex. The reactants are 560 grams of silicon metal, 40 grams of sodium hydroxide and 1,750 grams of aqueous ammonia (26 Be).

The sodium hydroxide is added to the reaction vessel containing the silicon metal and aqueous ammonia in the initial phase of the reaction. Due to the limited amount of sodium hydroxide added based upon the amount of silicon metal, only a slight endothermic phase is developed and the average temperature in the reaction is about 70° F., slightly below room temperature. In this process the erosion rate of the silicon must be in equilibrium with the addition of the sodium hydroxide in order to prevent salt formation. By carrying this reaction through the slight endothermic phase and thereafter, through the exothermic phase, a silicon/sodium inorganic polymeric complex is prepared which can be effectively used for gem stone preparation by application of degassing techniques.

EXAMPLE 32

A further silicon/sodium polymer useful for gem stone preparation is prepared by the dilution-reaction method. Some 500 ml of a previously formed silicon/- sodium inorganic polymeric complex having a specific gravity of 1.543 is diluted with aqueous ammonia. Upon dilution, two separate layers are initially formed, the bottom layer being the inorganic polymeric complex, and the top layer being the aqueous ammonia. These two separate layers, however, become miscible upon the addition of silicon metal and heat.

The original inorganic polymeric complex contained greater than 10% by weight sodium. In order to achieve a maximum sodium content of 10% by weight, additional silicon metal must be introduced into the inorganic polymeric complex. To achieve this, 131.7 grams of silicon metal are added to the two-phase system, with heating. As a result of this the two phases become misible and the silicon metal is taken out by the inorganic polymeric complex, thereby providing the desired ratio of silicon metal to sodium metal in the complex. This inorganic polymeric can now be utilized for gem stone preparation.

EXAMPLE 33

An aluminum/sodium polymer useful for gen stone preparation is prepared by reacting 702 grams of aluminum, 40 grams of sodium hydroxide and 1,820 grams of aqueous ammonia (26 Bé). By utilizing this small amount of sodium compared to the amount of aluminum, an inorganic polymeric complex is prepared which is capable of being utilized for gem stone preparation.

EXAMPLE 34

A further polymer of aluminum and sodium for gem stone preparation is prepared by the dilution technique. An aluminum/sodium inorganic polymeric complex is utilized which has a specific gravity of 1.673, the original polymer contained in excess of 5% sodium. In order to achieve a 5% sodium content in the inorganic polymeric complex, additional aluminum metal, i.e., 3,895 grams, must be present in the final product. Accordingly, 3,723.3 grams of aluminum are added to the original aluminum/sodium inorganic polymeric complex diluted with aqueous ammonia. This achieves a final product with a reduced sodium content, i.e., about 5%, useful for gem stone preparation. A dilution of the aluminum inorganic polymeric complex with aqueous ammonia is done slowly since this complex reacts vigorously with the aqueous ammonia.

EXAMPLE 35

An aluminum/sodium/calcium inorganic polymeric complex is prepared by reacting 486 grams of aluminum, 46 grams of sodium hydroxide, 40 grams of calcium hydroxide and 1,890 grams of aqueous ammonia. In this reaction, the sodium hydroxide is added initially in order to initiate the endothermic phase of the reaction, whereupon the calcium hydroxide is fed in and reacted with the inorganic polymeric complex formed.

The foregoing description has been directed to particular embodiments of the invention in accordance with the requirements of the Patent Statutes and for purposes of illustration and explanation. It will be apparent, however, to those skilled in this art that many modifications and changes in the procedures set forth will be possible without departing from the scope and spirit of the invention. It is applicants intention that the following claims be interpreted to embrace all such modifications and variations.

The subject matter which applicant claims as his invention is:

1. A method of producing an inorganic polymeric complex which comprises:
   reacting in an aqueous medium
   a. at least one non-alkaline metal selected from Groups I–VIII of the Periodic Table;
   b. an alkali metal hydroxide; and
   c. a source of reactive $NH_2$ groups according to the following sequence:
      i. introducing a predetermined quantity of said non-alkaline metal into a reaction vessel containing said aqueous medium;
      ii. providing in said aqueous medium, a supply of said source of $NH_2$ groups;
      iii. adding said alkali metal hydroxide to said reaction vessel, in the presence of said source of $NH_2$ groups, in such manner as to provide intimate contact between the alkali metal ions and the non-alkaline metal and a localized area in the immediate vicinity of said non-alkaline metal of pH approaching a value of 14, whereby the non-alkaline metal erodes, producing non-alkaline metal ions in said reaction medium, said non-alkaline metal ions entering into reaction with the alkali metal ions and reactive $NH_2$ groups to produce an inorganic monomeric complex;
      said alkali metal hydroxide being added at a rate sufficient to bind substantial quantities of $NH_2$ in an overall endothermic reaction with said alkali metal hydroxide and said non-alkaline metal;
      iv. thereafter establishing an exothermic reaction in said reaction vessel characterized by increased erosion of said non-alkaline metal and the formation of an inorganic polymeric complex; and
   terminating the reaction by removing any unreacted non-alkaline metal from the reaction medium.

2. The method of claim 1, wherein said source of $NH_2$ groups is aqueous ammonia.

3. The method of claim 2, wherein said aqueous ammonia is provided by bubbling gaseous ammonia through said aqueous medium.

4. The method of claim 2, wherein said aqueous ammonia is supplemented with ammonia gas.

5. The method of claim 1, wherein the exothermic reaction is initiated by heating the reaction vessel containing the inorganic monomeric complex following completion of the endothermic reaction.

6. The method of claim 1, wherein the exothermic reaction is initiated by adding additional non-alkaline metal to the reaction vessel containing the inorganic monomeric complex.

7. The method of claim 1, wherein the reaction is cooled during the addition of the alkali metal hydroxides to assist in the development of the endothermic reaction.

8. The method of claim 1, further including adding to the reaction vessel a small quantity of non-alkaline metal of a different non-alkaline metal of groups I–VIII of the periodic table, more reactive than said non-alkaline metal, to initiate the development of said endothermic reaction.

9. The method of claim 1, wherein the more reactive metal comprises the same non-alkaline metal of groups I–VIII of the periodic table, previously utilized in reaction with an alkali metal hydroxide and a source of reactive $NH_2$ groups through the exothermic reaction to produce the inorganic polymeric complex.

10. The method of claim 1, wherein said alkali metal hydroxide is selected from sodium hydroxide and potassium hydroxide.

11. The method of claim 1, wherein the alkali metal hydroxide is added to the reaction vessel in pellet form, the pellets sinking to the bottom of the reaction vessel proximate to the non-alkaline metal and producing said localized areas of high pH as they dissolve.

12. The method of claim 1, wherein said source of $NH_2$ groups comprises ammonia gas, said ammonia gas and alkali metal hydroxide being added to said reaction medium under controlled conditions so as to bind a substantial quantity of $NH_2$ groups released from the ammonia gas.

13. The method of claim 1, wherein said non-alkaline metal is silicon.

14. The method of claim 1, wherein said non-alkaline metal is aluminum.

15. The aqueous solution of inorganic polymeric complex produced by the method of claim 1.

16. A method which comprises: reacting in an aqueous medium a. at least one non-alkaline metal selected from Groups I–VIII of the Periodic Table;
b. an alkali metal hydroxide; and
c. a source of reactive $NH_2$ groups according to the following sequence:
   i. introducing a predetermined quantity of said non-alkaline metal into a reaction vessel containing said aqueous medium;
   ii. providing, in said aqueous medium, a supply of said source of $NH_2$ groups;
   iii. adding said alkali metal hydroxide to said reaction vessel, in the presence of said source of $NH_2$ groups, in such manner as to provide intimate contact between the alkali metal ions and the non-alkaline metal and a localized area in the immediate vicinity of said non-alkaline metal of pH approaching a value of 14,
   whereby the non-alkaline metal erodes, producing non-alkaline metal ions in said reaction medium, said non-alkaline metal ions entering into reaction with the alkali metal ions and reactive $NH_2$ groups to produce an inorganic monomeric complex;
   said alkaline metal hydroxide being added at a rate sufficient to bind substantial quantities of $NH_2$ groups in an overall endothermic reaction with said alkali metal hydroxide and said non-alkaline metal; and
terminating the reaction by removing any unreacted non-alkaline metal from the reaction medium.

17. The method of claim 16, wherein said source of $NH_2$ groups is aqueous ammonia.

18. The method of claim 17, wherein said aqueous ammonia is provided by bubbling gaseous ammonia through said aqueous medium.

19. The method of claim 17, wherein said aqueous ammonia is supplemented with ammonia gas.

20. The method of claim 16, wherein the reaction is cooled during the addition of the alkali metal hydroxide to assist in the development of the endothermic reaction.

21. The method of claim 16, further including adding to the reaction vessel a small quantity of a non-alkaline metal of a different non-alkaline metal of groups I–VIII of the periodic table, more reactive than said non-alkaline metal, to initiate the development of said endothermic reaction.

22. The method of claim 16, wherein said alkali metal hydroxide is selected from sodium hydroxide and potassium hydroxide.

23. The method of claim 16, wherein the alkali metal hydroxide is added to the reaction vessel in pellet form, the pellets sinking to the bottom of the reaction proximate to the non-alkaline metal and producing said localized areas of high pH as they dissolve.

24. The method of claim 16, wherein said source of $NH_2$ groups comprises ammonia gas, said ammonia gas and alkali metal hydroxide being added to said reaction medium under controlled conditions so as to bind a substantial quantity of $NH_2$ groups released from the ammonia gas.

25. The method of claim 16, wherein said non-alkaline metal is silicon.

26. The method of claim 16, wherein said non-alkaline metal is aluminum.

27. The aqueous solution of inorganic monomeric complex produced by the method of claim 16.

* * * * *